(12) United States Patent
Kurahashi et al.

(10) Patent No.: US 9,485,482 B2
(45) Date of Patent: Nov. 1, 2016

(54) IMAGING DEVICE, METHOD FOR CONTROLLING IMAGING DEVICE, AND STORAGE MEDIUM STORING A CONTROL PROGRAM FOR COLOR MIXING CORRECTION

(71) Applicant: FUJIFILM Corporation, Tokyo (JP)

(72) Inventors: Hidekazu Kurahashi, Saitama (JP); Hayato Yamashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/315,528

(22) Filed: Jun. 26, 2014

(65) Prior Publication Data

US 2014/0307123 A1    Oct. 16, 2014

Related U.S. Application Data

(63) Continuation of application No. PCT/JP2012/083972, filed on Dec. 27, 2012.

(30) Foreign Application Priority Data

Dec. 27, 2011    (JP) .................................. 2011-286687

(51) Int. Cl.
*H04N 9/73*    (2006.01)
*H04N 9/64*    (2006.01)
(Continued)

(52) U.S. Cl.
CPC ............ *H04N 9/735* (2013.01); *H04N 5/3456* (2013.01); *H04N 9/045* (2013.01); *H04N 9/646* (2013.01); *H04N 2209/045* (2013.01)

(58) Field of Classification Search
CPC ....... H04N 9/735; H04N 9/646; H04N 9/045
USPC ................................... 348/272–280; 382/300
See application file for complete search history.

(56) References Cited

U.S. PATENT DOCUMENTS 6,995,796 B2    2/2006    Taubman
2002/0149686 A1    10/2002    Taubman
(Continued)

FOREIGN PATENT DOCUMENTS

JP    8-23542 A    1/1996
JP    8-23543 A    1/1996
(Continued)

OTHER PUBLICATIONS

International Search Report issued in PCT/JP2012/083972, mailed on Mar. 12, 2013.
(Continued)

*Primary Examiner* — Lin Ye
*Assistant Examiner* — Chan Nguyen
(74) *Attorney, Agent, or Firm* — Birch, Stewart, Kolasch & Birch, LLP

(57) ABSTRACT

An imaging apparatus (10) includes: an image pickup device (14) including plural photoelectric conversion elements arrayed in a predetermined first direction and second direction; a color filter that has a repeatedly disposed basic array pattern that includes a first filter corresponding to a first color that contributes most to obtaining a brightness signal, and second filters corresponding second colors, placed in a predetermined pattern; a drive section (22) that drives the image pickup device (14) such that, for an array of pixels to read from the image pickup device (14), pixel data of pixels placed at a set cycle in at least one direction of the first direction or the second direction is read to give a second array that is different from a first array expressing an array of all the pixels read from the image pickup device (14); and an image processing section (20) that corrects pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array.

14 Claims, 29 Drawing Sheets

(51) Int. Cl.
*H04N 9/04* (2006.01)
*H04N 5/345* (2011.01)

(56) References Cited

U.S. PATENT DOCUMENTS

| | | | |
|---|---|---|---|
| 2003/0147564 A1* | 8/2003 | Lee | 382/300 |
| 2004/0109068 A1 | 6/2004 | Mitsunaga et al. | |
| 2004/0169747 A1 | 9/2004 | Ono et al. | |
| 2006/0203113 A1 | 9/2006 | Wada et al. | |
| 2006/0222269 A1 | 10/2006 | Ohno | |
| 2007/0153104 A1 | 7/2007 | Ellis-Monaghan et al. | |
| 2008/0106631 A1* | 5/2008 | Sugawara et al. | 348/336 |
| 2008/0151083 A1 | 6/2008 | Hains et al. | |
| 2009/0096887 A1 | 4/2009 | Tamaoki | |
| 2009/0096899 A1* | 4/2009 | Quan | 348/273 |
| 2009/0128658 A1* | 5/2009 | Hayasaka et al. | 348/222.1 |
| 2010/0134660 A1 | 6/2010 | Yamauchi | |
| 2010/0271523 A1* | 10/2010 | Hara | 348/302 |
| 2011/0069189 A1 | 3/2011 | Venkataraman et al. | |
| 2012/0025060 A1 | 2/2012 | Iwata | |

FOREIGN PATENT DOCUMENTS

| | | |
|---|---|---|
| JP | 11-285012 A | 10/1999 |
| JP | 2000-308080 A | 11/2000 |
| JP | 2002-135793 A | 5/2002 |
| JP | 2004-221839 A | 8/2004 |
| JP | 2004-266369 A | 9/2004 |
| JP | 2005-136766 A | 5/2005 |
| JP | 2007-184904 A | 7/2007 |
| JP | 3960965 B2 | 8/2007 |
| JP | 2007-306490 A | 11/2007 |
| JP | 2008-236620 A | 10/2008 |
| JP | 2009-100203 A | 5/2009 |
| JP | 2010-512048 A | 4/2010 |
| JP | 2010-130583 A | 6/2010 |
| JP | 2010-153511 A | 7/2010 |
| JP | 2011-523538 A | 8/2011 |
| WO | WO 02/056604 A1 | 7/2002 |
| WO | WO 2008/066698 A2 | 8/2008 |
| WO | WO 2009/151903 A2 | 12/2009 |

OTHER PUBLICATIONS

Office Action issued in Chinese Patent Application No. 201180022503.3, issued on May 23, 2013.
PCT/ISA/237—Issued in PCT/JP2012/080898, mailed on Jan. 22, 2013.
PCT/ISA/237—Issued in PCT/JP2012/080899, mailed on Jan. 15, 2013.
PCT/ISA/237—Issued in PCT/JP2012/081644, mailed on Jan. 15, 2013.
PCT/ISA/237—Issued in PCT/JP2012/083583, mailed on Jan. 29, 2013.
PCT/ISA/237—Issued in PCT/JP2012/083972, mailed on Mar. 12, 2013.
Extended European Search Report, dated May 28, 2015, in related application EP 12862743.7.

* cited by examiner

FIG.4

A ARRAY   B ARRAY

A ARRAY    B ARRAY

AFTER 1/2 THINNING

| P | | | | | | | | | | |
|---|---|---|---|---|---|---|---|---|---|---|
| B | R | R | G | G | G | B | R | R | G | G | G |
| B | G | B | G | R | G | B | G | B | G | R | G |
| R | R | B | G | G | G | R | R | B | G | G | G |
| G | G | G | R | B | B | G | G | G | R | B | B |
| G | B | G | R | G | R | G | B | G | R | G | R |
| G | G | G | B | B | R | G | G | G | B | B | R |
| B | R | R | G | G | G | B | R | R | G | G | G |
| B | G | B | G | R | G | B | G | B | G | R | G |
| R | R | B | G | G | G | R | R | B | G | G | G |
| G | G | G | R | B | B | G | G | G | R | B | B |
| G | B | G | R | G | R | G | B | G | R | G | R |
| G | G | G | B | B | R | G | G | G | B | B | R |

IMAGING DEVICE, METHOD FOR CONTROLLING IMAGING DEVICE, AND STORAGE MEDIUM STORING A CONTROL PROGRAM FOR COLOR MIXING CORRECTION

CROSS-REFERENCE TO RELATED APPLICATIONS

This application is a continuation application of International Application No. PCT/JP2012/083972, filed Dec. 27, 2012, the disclosure of which is incorporated herein by reference in its entirety. Further, this application claims priority from Japanese Patent Application No. 2011-286687, filed Dec. 27, 2011.

BACKGROUND

1. Technical Field

The present invention relates to an imaging apparatus, and a control method and a control program for an imaging apparatus, and in particular to an imaging apparatus equipped with a color image pickup device, and a control method and control program for an imaging apparatus of the same.

2. Related Art

A primary system color Bayer array (see, for example, Patent Documents 1 to 3), this being a color array widely employed in color image pickup devices, has red (R) and blue (B) placed in sequential lines of a chessboard pattern of green (G) pixels, to which the human eye is most sensitive and that contribute most to obtaining a brightness signal.
Patent Document 1: Japanese Patent Application Laid-Open (JP-A) No. 2002-135793
Patent Document 2: Japanese Patent No. 3960965
Patent Document 3: JP-A No. 2004-266369

However, sometimes color mixing occurs during image capture using a color image pickup device due to the influence of light leaking in from adjacent pixels. In such cases, normally a color mixing ratio due to the influence of light leaking in from adjacent pixels is measured in advance, and then pixel data for each of the pixels is corrected based on this color mixing ratio.

In a color image pickup device employing a conventional Bayer array, in order to, for example, generate image data for a video, in cases in which 1 line worth of pixel data is read from every 3 pixel lines in the vertical direction (vertical direction 1/3 thinning), and 1 pixel worth of image data is read for every 3 pixels in the horizontal direction (horizontal direction 1/3 thinning), both an image read by thinning and the original image are the same Bayer array. Therefore the color of a pixel adjacent to a subject pixel for color mixing correction is the same before thinning as after thinning, and thereof color mixing correction may be performed unmodified by employing pixel values of pixels adjacent in the image after thinning.

However, in cases in which a color filter is employed with a basic array pattern, this being the smallest repeating unit, that is larger than that of a Bayer array, for example a 6×6 pixel basic array pattern, in cases in which 1/2 thinning or 1/3 thinning is performed in both the vertical direction and the horizontal direction, sometimes the image after thinning has a different array to the basic array pattern of the image before thinning. In such cases, the color of the pixel that is adjacent to a subject pixel for color mixing correction is a different color to the pixel that is adjacent prior to thinning, resulting in the problem that the precision of color mixing correction deteriorates if color mixing correction is performed unmodified using pixel values of pixels that are adjacent the image after thinning.

SUMMARY

The present invention addresses the above problem, and an object thereof is to provide an imaging apparatus, and a control method and a control program for an imaging apparatus capable of performing color mixing correction with excellent precision.

In order to solve the above problem, an imaging apparatus of the present invention includes: an image pickup device including plural photoelectric conversion elements arrayed in a predetermined first direction and a second direction intersecting with the first direction; a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern; a drive section that drives the image pickup device such that, for an array of pixels to read from the image pickup device, pixel data of pixels placed at a set cycle in at least one direction of the first direction or the second direction is read to give a second array that is different from a first array expressing an array of all the pixels read from the image pickup device; and a color mixing correction section that performs color mixing correction for each of the pixel data of the pixels placed at the set cycle, wherein the color mixing correction section corrects pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array.

According to the invention, correcting pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array enables excellent precision of color mixing correction to be achieved.

Note that configuration may be made such that: there is one or more of the first filter placed in each line in the color filter in the first direction, the second direction, and third directions that intersect with the first direction and the second direction; and the second filters that respectively correspond to each color of the second colors are placed such that there is 1 or more of each in each line in the basic array pattern in the first direction and the second direction.

According to the invention, the first filter that corresponds to the first color that contributes most to obtaining a brightness signal is placed in each line in the color filter in the first direction to the third directions, thereby enabling reproduction precision of synchronization processing to be raised in high frequency regions. Moreover, the second filters that respectively correspond to each color of the 2 or more second colors other than the first color are placed such that there is 1 or more of each in each line in the basic array pattern in the first direction and the second direction, thereby enabling generation of color moiré (false color) to be reduced, and enabling higher definition images to be achieved.

Moreover, configuration may be made such that the color filter is a color filter with a repeatedly disposed basic array pattern, the basic array pattern having the first filter that corresponds to the first color that contributes most to obtaining the brightness signal, and the second filters that respectively correspond to 2 or more second colors other than the first color, placed in a predetermined pattern of (N×M) pixels (wherein N, M are integers of 3 or more) in the first direction and the second direction.

Configuration may be made such that the color filter includes a square array corresponding to 2×2 pixels configured from the first filter.

According to the invention, which direction, out of each of the four directions, is the brightness correlation direction can be determined by determination of the minimum pixel separation based on difference values of pixel values between each of the pixels of the 4 pixels of the square array corresponding to the 2×2 pixels.

Configuration may be made such that the first color is green (G), and the second colors are red (R) and blue (B).

Configuration may be made such that: the color filter, includes R filter, a G filter, and a B filter corresponding to colors red (R), green (G) and blue (B); and the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

According to the invention, if 5×5 pixels (a local region of a mosaic image) are extracted centered on the first array or the second array, 2×2 pixels of G pixels are present at the 4 corners of the 5×5 pixels. The pixel values of these 2×2 pixels of G pixels can be employed to determine the correlation direction out of 4 directions.

Moreover, configuration may be made such that: the color filter includes an R filter, a G filter, and a B filter corresponding to colors red (R), green (G) and blue (B); and the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

According to the invention, if 5×5 pixels (a local region of a mosaic image) are extracted centered on the first array or the second array, there is a G pixel present in adjacent contact in the horizontal direction and the vertical direction with the central pixel (the R pixel or the B pixel) of the 5×5 pixels. The pixel values of these G pixels (a total of 8 pixels) can be employed to determine the correlation direction out of 4 directions.

Note that in cases in which there are plural shortest distance pixels present, the color mixing correction section may correct the pixel data of the subject pixel based on pixel data of any pixel of the plural pixels.

Moreover, configuration may be made such that the color mixing correction section corrects pixel data of the subject pixel based on an average value of pixel data of plural pixels in cases in which there are plural pixels present at the shortest distance.

Preferably the cycle is a cycle of 3 or fewer pixels.

Configuration may be made to further include a switching section that switches the cycle.

An imaging apparatus control method of the present invention is a control method for an imaging apparatus including an image pickup device including plural photoelectric conversion elements arrayed in a predetermined first direction and a second direction intersecting with the first direction, a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern. The control method includes: driving the image pickup device such that, for an array of pixels to read from the image pickup device, pixel data of pixels placed at a set cycle in at least one direction of the first direction or the second direction is read to give a second array of pixels read from the image pickup device that is different from a first array expressing an array of all the pixels of the image pickup device; and color mixing correction processing that performs color mixing correction for each of the pixel data of the pixels placed at the set cycle, wherein pixel data of a subject pixel for color mixing correction is corrected based on pixel data of a pixel that is the same color as an adjacent pixel in adjacent contact with the subject pixel in the first array, and that is a pixel that has the shortest distance from the adjacent pixel in the first array.

A control program of the present invention is a control program that causes processing to be executed in a computer that controls an imaging apparatus, including an image pickup device including plural photoelectric conversion elements arrayed in a predetermined first direction and a second direction intersecting with the first direction, a color filter that is provided above plural pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern. The processing includes: a step of driving the image pickup device such that, for an array of pixels to read from the image pickup device, pixel data is only read from pixels placed at a set cycle in at least one direction of the first direction or the second direction to give a second array that is different from a first array expressing an array of all the pixels of the image pickup device; and a step of color mixing correction processing that performs color mixing correction for each of the pixel data of the pixels placed at the set cycle, wherein pixel data of a subject pixel for color mixing correction is corrected based on pixel data of a pixel that is the same color as an adjacent pixel in adjacent contact with the subject pixel in the first array, and that is a pixel that has the shortest distance from the adjacent pixel in the first array.

A control program of the present invention causes processing to be executed in a computer, the processing being color mixing correction processing to correct color mixing of an array of pixels read from an image pickup device including plural photoelectric conversion elements arrayed in a predetermined first direction and a second direction intersecting with the first direction, a color filter that is provided above plural pixels configured by the plural photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern, and the color mixing correction processing performing color mixing correction for respective pixel data of read pixels wherein the pixel data is for pixels placed at a set cycle in at least one direction of the first direction or the second direction to give a second array that is different from a first array expressing an array of all the pixels of the image pickup device, and including a step of correcting pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array.

ADVANTAGEOUS EFFECTS OF INVENTION

According to the present invention, the advantageous effect is exhibited of enabling color mixing correction to be performed with excellent precision.

BRIEF DESCRIPTION OF DRAWINGS

FIG. 4 is a diagram illustrating a color filter in which 6×6 pixel basic array patterns contained in a color filter according to the first exemplary embodiment are split into 3×3 pixel A arrays and B arrays that are repeatedly disposed along a horizontal direction and a vertical direction.

FIG. 12 is a diagram to explain color mixing correction processing.

FIG. 15 is a diagram to explain color mixing correction processing.

FIG. 16 is a diagram to explain color mixing correction processing.

FIG. 23 is a diagram of a modified example of a color filter.

FIG. 26 is a diagram of a modified example of a color filter.

FIG. 27 is a diagram of a modified example of a color filter.

FIG. 29 is a diagram of a modified example of a color filter.

DESCRIPTION OF EMBODIMENTS

Explanation follows regarding exemplary embodiments of the present invention, with reference to the drawings.

First Exemplary Embodiment

Figure 1:
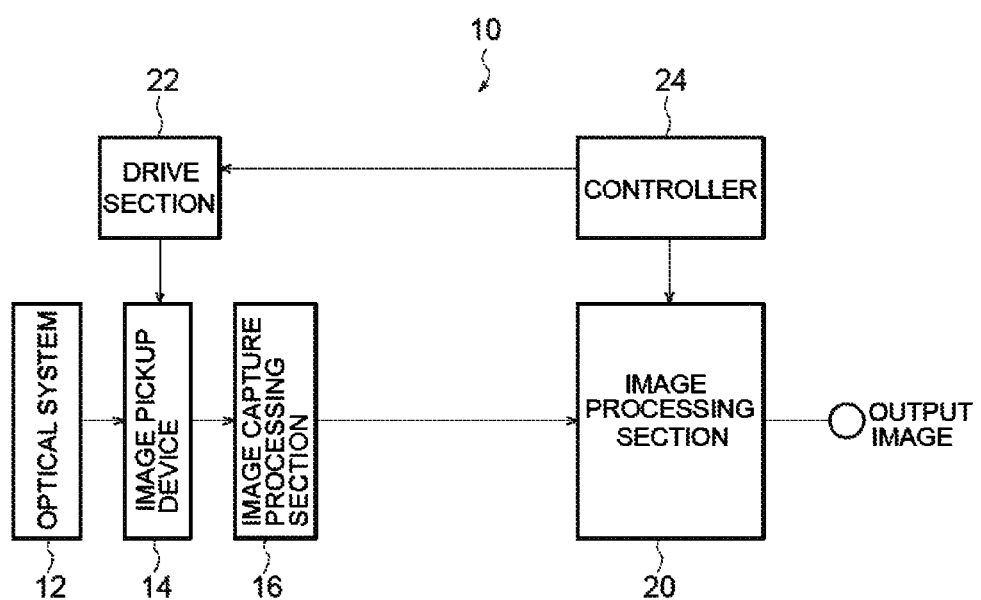
FIG. 1 is a schematic block diagram of an imaging apparatus according to a first exemplary embodiment.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including, for example, a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS), containing plural photoelectric conversion elements arrayed in the horizontal direction and vertical direction, with a color filter disposed above the image pickup device.

Figure 2:
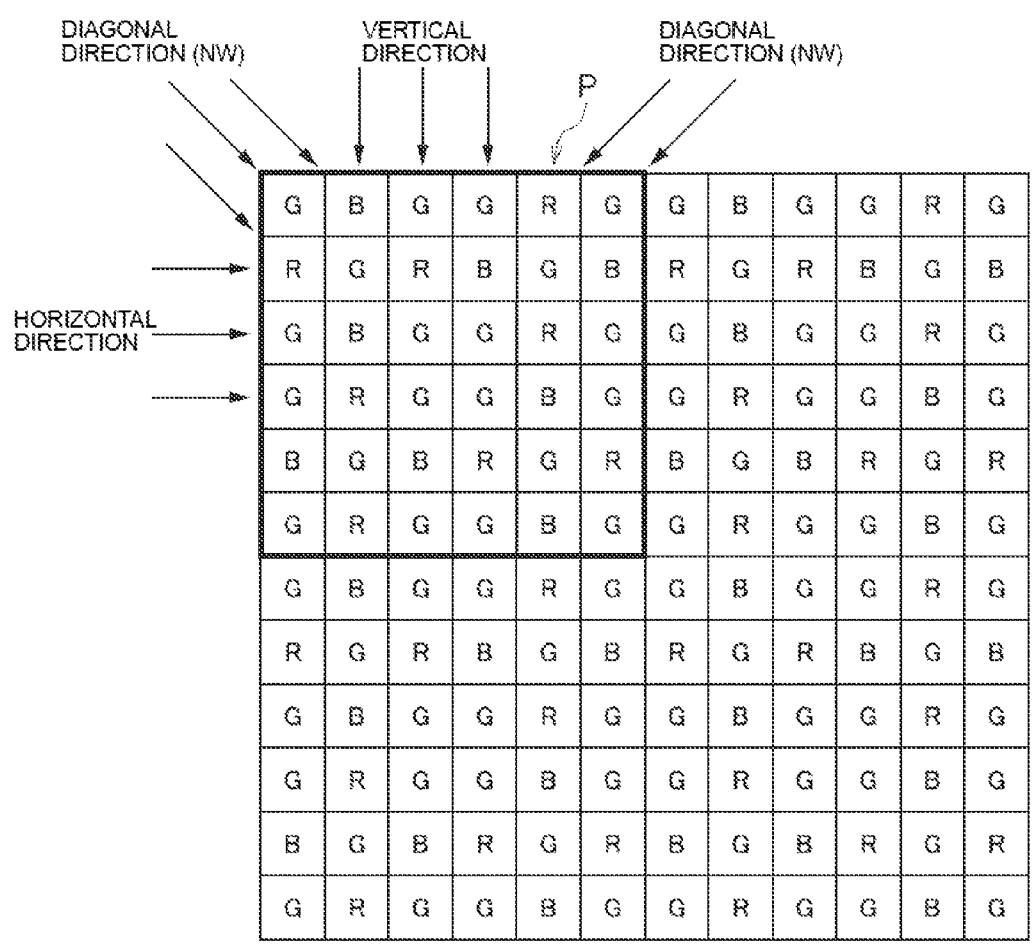
FIG. 2 is a configuration diagram of a color filter according to the first exemplary embodiment.

FIG. 2 illustrates a portion or a color filter according to the present exemplary embodiment. One out of 3 primary color filters red (R), green (G) and blue (B) is placed over each of the pixels.

Color Filter Array Features

The color filter of the first exemplary embodiment includes the following features (1) to (6).

Feature (1)

The color filter array has a repeatedly disposed basic array pattern of a predetermined pattern of (N×M) pixels (wherein N, M are integers of 3 or more) in the vertical direction and the horizontal direction of the 3 primary color filters red (R), green (G) and blue (B), wherein the green (G) filter and at least one color filter out of the red (R) or the blue (B) is placed in each of the vertical direction and the horizontal direction.

The color filter according to the present exemplary embodiment illustrated in FIG. 2 includes a basic array pattern P (the pattern indicated by the bold frame) formed from square array patterns corresponding to, as an example, 6×6 pixels (N=M=6), with the basic array pattern P disposed so as to repeat in both the horizontal direction (a first direction) and the vertical direction (a second direction). Namely, the color filter is arrayed such that the respective filters of each color R, G, B (the R filters, G filters, B filters) have a specific periodicity.

Thus arraying the R filters, G filters and B filters with a specific periodicity enables processing to be performed in a repeating pattern during, for example, synchronization processing (also referred to as demosaic processing, the same applies below) of R, G, B signals read from the color image pickup device.

Feature (2)

The color filter array illustrated in FIG. 2 has the G filter, that corresponds to the color contributing the most to obtaining a brightness signal (the color G in the present exemplary embodiment) placed in each line in the color filter array in the vertical direction that is the first direction, the horizontal direction that is the second direction, and third directions in the color filter plane that intersect with the first direction and the second direction, namely diagonal directions (NE, NW) (third directions). Note that NE means a diagonal direction toward the top right, and NW means a diagonal direction toward the bottom right. For example, for a square pixel array, the diagonal top right direction and the diagonal bottom right direction are directions at 45° with respect to the horizontal direction. However, in a rectangular pixel array, these are the directions of the pair of diagonals of a rectangle, and their angle varies according to the lengths of the long sides and the short sides.

Placing the G filters corresponding to the brightness system pixels in each of the lines in the vertical direction, horizontal direction, and diagonal directions (NE, NW) of the color filter array, enables the reproduction precision of synchronization processing to be raised in high frequency regions, irrespective of the directionality of the high frequency.

Feature (3)

In the color filter array illustrated in FIG. 2, 1 or more of each of the R filter and B filter, corresponding to the 2 or more colors other than the above color (colors R, B in the present exemplary embodiment), is disposed in each line in the basic array pattern P in the vertical direction and horizontal direction of the color filter array.

Disposing the R filter and the B filter in each line in the vertical direction and horizontal direction of the color filter array enables generation of color moiré (false color) to be reduced.

This thereby enables an optical low pass filter for suppressing false color generation to be omitted from placement on the optical path of the optical system, from the incident face to the imaging plane, or, even in cases in which an optical low pass filter is applied, one can be employed that has a weak action to cut the high frequency components to prevent false color generation, thereby enabling deterioration of resolution to be avoided.

Feature (4)

Figure 3:
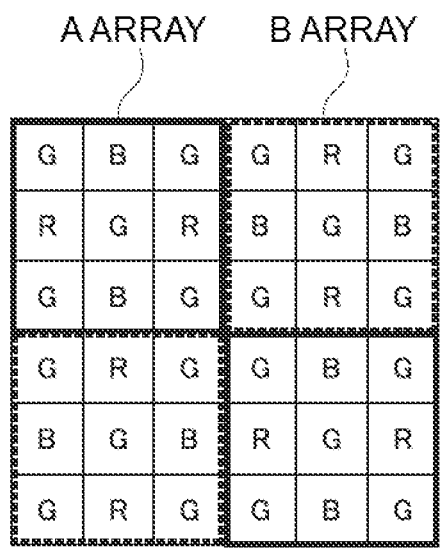
FIG. 3 is a diagram illustrating a basic array pattern contained in a color filter according to the first exemplary embodiment.

FIG. 3 illustrates a state in which the basic array pattern P illustrated in FIG. 2 has been divided into 4 sets of 3×3 pixels.

The basic array pattern P, as illustrated in FIG. 3, may be perceived as an A array of the 3×3 pixels surrounded by the solid line frame, and a B array of the 3×3 pixels surrounded by the broken line frame, arrayed so as to be alternately disposed along the horizontal and vertical directions.

In both the A array and the B array, the G filters that are the brightness system pixels are placed at the 4 corners and at the center, thereby being placed over both diagonal lines. In the A array, R filters are placed on both sides of the central G filter in the horizontal direction, and B filters are placed on both sides of the central G filter in the vertical direction. However in the B array, B filters are placed on both skies of the central G filter in the horizontal direction, and R filters are placed on both sides of the central G filter in the vertical direction. Namely, the A array and the B array have reverse positional relationships for the R filters and the B filters, but have similar placement otherwise.

Figure 4:
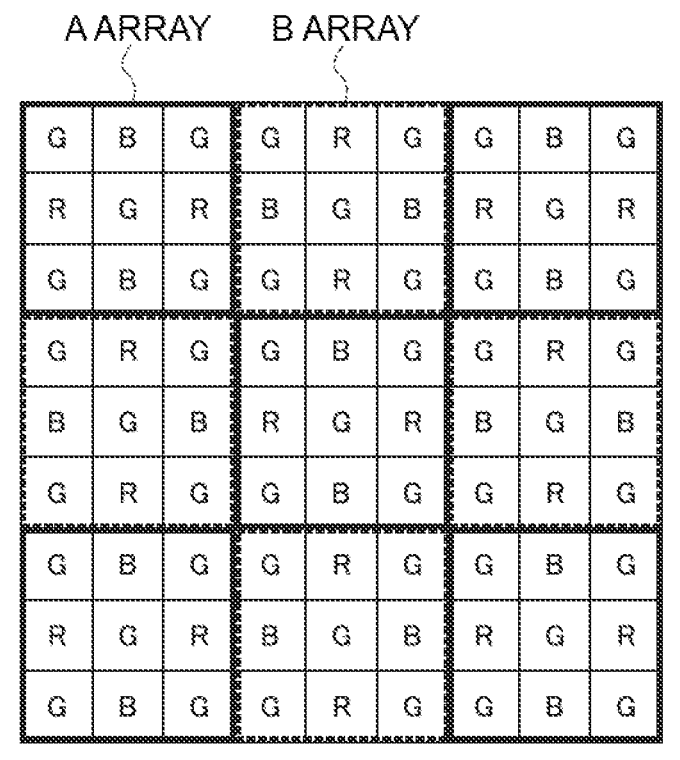

Due to disposing the A array and the B array alternately in the vertical direction and the horizontal direction, as illustrated in FIG. 4, the 4 corner G filters in the A array and the B array form square array filters corresponding to 2×2 pixels.

Namely, the color filter array (basic array pattern P) illustrated in FIG. 2 includes square arrays corresponding to 2×2 pixels configured by G filters.

Figure 5:
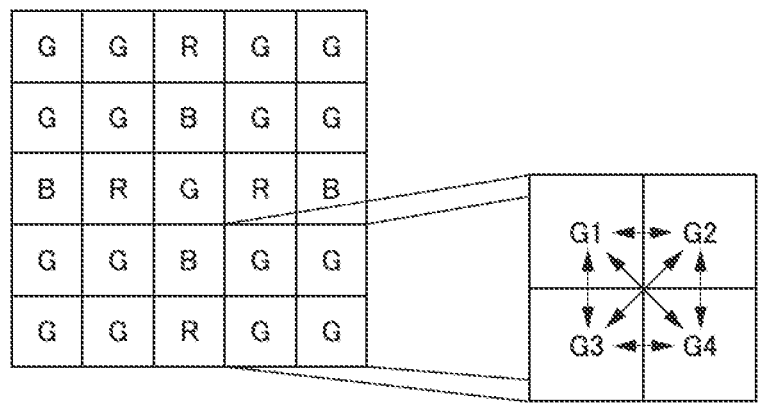
FIG. 5 is a diagram illustrating a distinctive placement of G pixels in a color filter according to a first exemplary embodiment.

When, as illustrated in FIG. 5, a 5×5 pixel local region centered on an A array is extracted from a mosaic image output from the image pickup device 14, the 2×2 pixels of G pixels at the 4 corners in the local region are disposed as illustrated in FIG. 5.

As illustrated in FIG. 5, taking the pixel values of the 2×2 pixels of G pixels as $G1$, $G2$, $G3$, $G4$ in sequence from top left to bottom right, the vertical direction difference absolute value of the pixel values of these G pixels is $(|G1-G3|+|G2-G4|)/2$, the difference absolute value in the horizontal direction is $(|G1-G2|+|G3-G4|)/2$, the difference absolute value in the diagonal direction towards the top right is $|G2-G3|$, and the difference absolute value in the diagonal direction towards the top left is $|G1-G4|$.

The correlation (correlation direction) can then be determined as the direction with the smallest difference absolute value out of these four correlation absolute values.

As illustrated in FIG. 4 or FIG. 5, when 5×5 pixel local region is extracted from a mosaic image such that the 3×3 pixel A array is positioned at its center, there are 2×2 pixels of G pixels placed at the 4 corners thereof. Consequently, when the 3×3 pixels of the A array inside the above local region are pixels subject to synchronization processing, the sums (or the average values) of the correlation absolute values of the 4 corners are derived separately for each direction, and the direction having the smallest value out of the sums (or the average values) of the correlation absolute values for each direction is determined as the brightness correlation direction of the pixels subject to synchronization processing. The determined correlation direction may be employed when performing synchronization processing or the like.

Feature (5)

Moreover, the basic array pattern P configuring the color filter array illustrated in FIG. 2 has point symmetry about the center of the basic array pattern (the center of the 4 G filters). Moreover, as illustrated in FIG. 3, each of the A array and the B array inside the basic array pattern also respectively have point symmetry about the central G filters, and also have top-bottom and left-right symmetry (line symmetry).

This symmetry enables the circuit scale of a processing circuit at a later stage to be made smaller, and to be simplified.

The image capture processing section 16 performs predetermined processing on image capture signals output from the image pickup device 14, such as amplification processing, correlation double sampling processing, or A/D conversion processing, and then outputs as image data to the image processing section 20.

The image processing section 20 subjects the image data output from the image capture processing section 16 to what is referred to as synchronization processing. Namely, for all the pixels, interpolation is performed of image data for colors other than the corresponding respective color from pixel data of peripheral pixels, so as to generate R, G, B image data for all pixels. Then, what is referred to as YC conversion processing is performed to the generated R, G, B image data, to generate brightness data Y and color difference data Cr, Cb. Resizing processing is then performed to re-size these signals to a size according to the image capture mode.

Moreover, the image processing section 20 as described in detail later, performs color mixing correction processing for each pixel, based on pixel data of adjacent pixels. For example, in cases in which thinned reading is performed, in cases in which the color array of the image after thinning is different from the color array of the image before thinning, correction of pixel data is performed for the subject pixel for color mixing correction based on pixel data of a pixel that is the same color as an adjacent pixel in adjacent contact with the subject pixel for color mixing correction in the array prior to thinning (a first array) and that has the shortest distance from the adjacent pixel in the array prior to thinning. This thereby enables color mixing correction to be performed with excellent precision even in cases in which the color array of the image after thinning is different from the color array of the image prior to thinning.

The drive section 22 performs driving such as reading image capture signals from the image pickup device 14 according to instruction from the controller 24.

The controller 24 performs overall control, such as of the drive section 22 and the image processing section 20, according to such factors as the image capture mode. Detailed description is given later, however, briefly, the controller 24 instructs the drive section 22 to read image capture signals with a reading method according to the image capture mode, and instructs the image processing section 20 to perform image processing according to the image capture mode.

Since, depending on the image capture mode, there is a need to thin and read the image capture signals from the image pickup device 14, the controller 24 instructs the drive section 22 so as to thin with a thinning method according to the instructed image capture mode and to read the image capture signals. Namely, it is possible to switch thinning method, by the controller 24 instructing the drive section 22 to read pixel data for each of the pixels at a given pixel cycle in the vertical direction, and a given pixel cycle in the horizontal direction.

As the image capture mode, there is a still image mode that captures a still image, and video modes, including an HD video mode that thins a captured image and generates High Definition (HD) video data at a comparatively high resolution and records this on a recording medium such as a memory card, not illustrated in the drawings, and a through video mode (live-view mode) in which a captured image is thinned and a through video (live-view image) of comparatively low resolution is output to a display section, not illustrated in the drawings. However, the type of image capture mode is not limited thereto.

Figure 6:
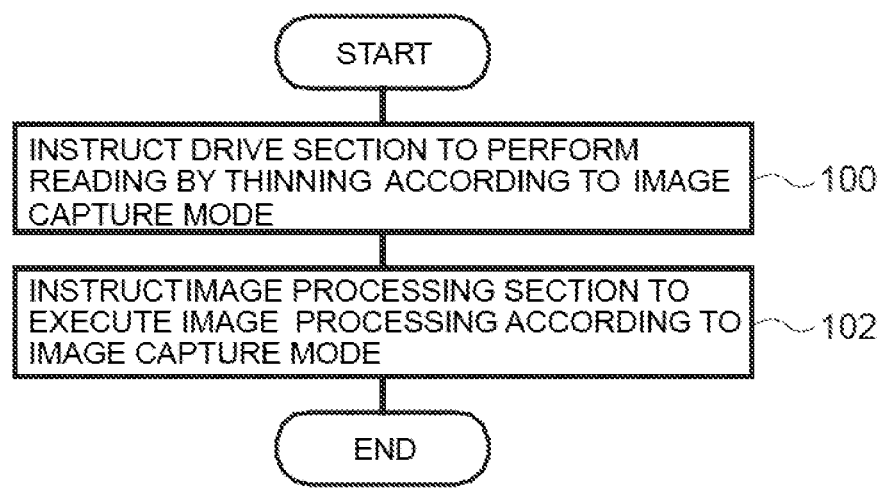
FIG. 6 is a flow chart of processing executed in a controller.

Explanation next follows regarding processing executed by the controller 24 as operation of the present exemplary embodiment, with reference to the flow chart illustrated in FIG. 6.

Note that the processing illustrated in FIG. 6 is executed in cases in which instruction is given to execute image capture according to the image capture mode.

Figure 7:
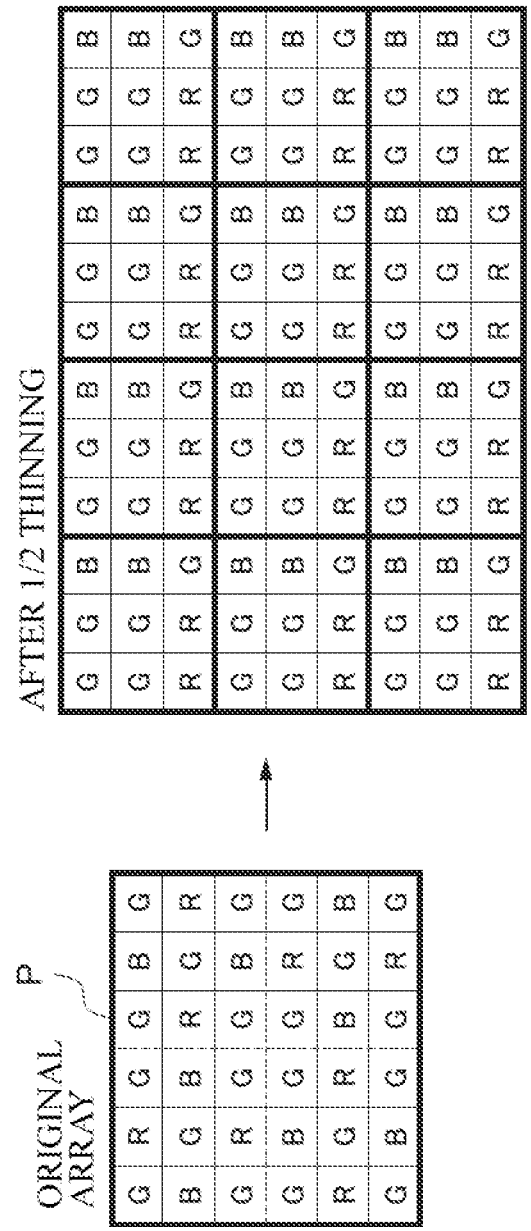
FIG. 7 is a diagram to explain a case in which reading with 1/2 thinning is performed in the vertical direction and the horizontal direction.

First, at step 100, the drive section 22 is instructed so as to read pixel data by the thinning method corresponding to the image capture mode, namely the pixel data of pixels at cycles set in the vertical direction and horizontal direction according to the image capture mode (in the present exemplary embodiment the drive section 22 and the controller 24 correspond to the drive means). In the present exemplary embodiment, as an example, pixel data is read from each of the pixels at 2 pixel cycles in both the vertical direction and horizontal direction, namely at 1/2 thinning. In this case, the image data after thinning is an image such as that illustrated in FIG. 7. Namely, the image array after thinning is different from the image array before thinning. Even in cases in which the image array after thinning includes the same array to the image array before thinning, namely the image after thinning contains an image in which the basic array pattern P is repeated, the two images are treated as being different from each other unless the image array after thinning completely matches the array before thinning in both the vertical direction and horizontal direction.

At step 102, the image processing section 20 is instructed so as to execute color mixing correction processing on the read image data, and to execute image processing according to the image capture mode (for example: synchronization processing, YC conversion processing, and resizing processing) on the image data after color mixing correction processing (in the present exemplary embodiment, the image processing section 20 and the controller 24 correspond to the color mixing correction means).

The color mixing correction processing executes processing such as the following on each of the pixels. For example, if the pixel data of the subject pixel for color mixing correction is denoted Da, the pixel data of the pixel in adjacent contact with the top side of the subject pixel is denoted D1, the pixel data of the pixel in adjacent contact with the bottom side of the subject pixel is denoted D2, the pixel data of the pixel in adjacent contact with the left side of the subject pixel is denoted D3, the pixel data of the pixel in adjacent contact with the right side of the subject pixel is denoted D4, the color mixing ratio received by the subject pixel from the pixel at the top side of the subject pixel is denoted K1, the color mixing ratio received by the subject pixel from the pixel at the bottom side of the subject pixel is denoted K2, the color mixing ratio received by the subject pixel from the pixel the left side of the subject pixel is denoted K3, and the color mixing ratio received by the subject pixel from the pixel at the right side of the subject pixel is denoted K4, then the pixel data Db after correction of the subject pixel is computed by the equation given below. Note that the color mixing ratios K1 to K4 are computed by measuring the leak-in of light from pixels in adjacent contact with the top side, measuring the leak-in of light from pixels in adjacent contact with the bottom side, measuring the leak-in of light from pixels in adjacent contact with the left side, and measuring the leak-in of light from pixels in adjacent contact with the right side, and then respectively computing each ratio based on these measured values.

$$Db = Da - (D1 \times K1 + D2 \times K2 + D3 \times K3 + D4 \times K4) \qquad \text{Equation (1)}$$

Explanation next follows regarding a specific example of the color mixing correction processing.

Figure 8:
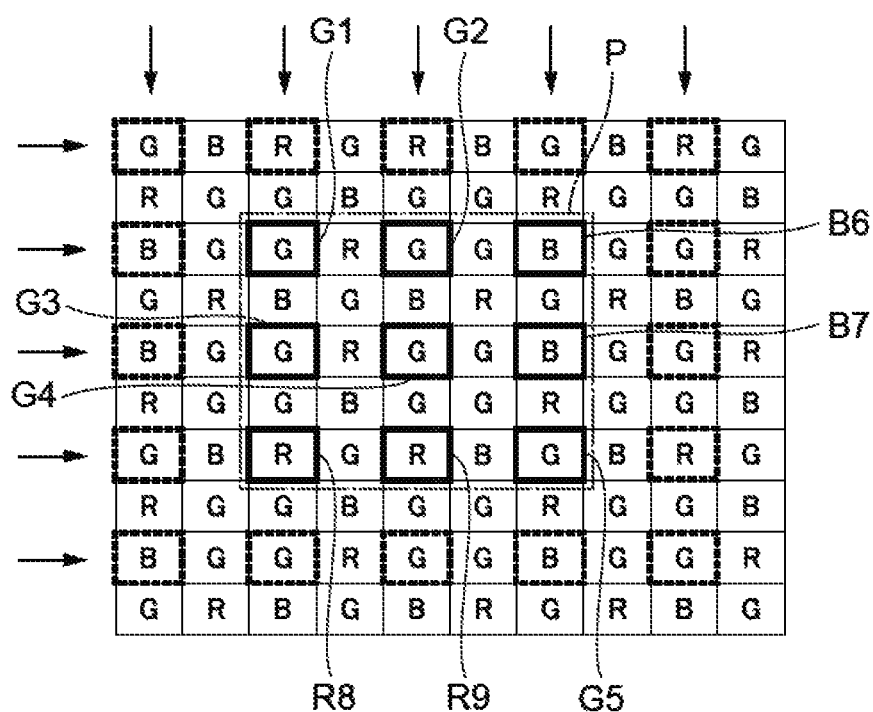
FIG. 8 is a diagram to explain color mixing correction processing.

FIG. 8 illustrates an example of a color filter array with a 6×6 pixel basic array pattern P disposed at its center. As illustrated in FIG. 8, when pixel data is read for each of the pixels 1/2 thinned in both the vertical direction and the horizontal direction, pixel data is read from the pixels with the dashed line frames and the solid line frames positioned as indicated by the arrows in the drawing.

Explanation follows regarding a case in which color mixing correction is performed on the G pixels G1 to G5, the B pixels B6, B7, and the R pixels R8, R9, illustrated by the solid line frames, that are read from within the basic array pattern P.

Figure 9:
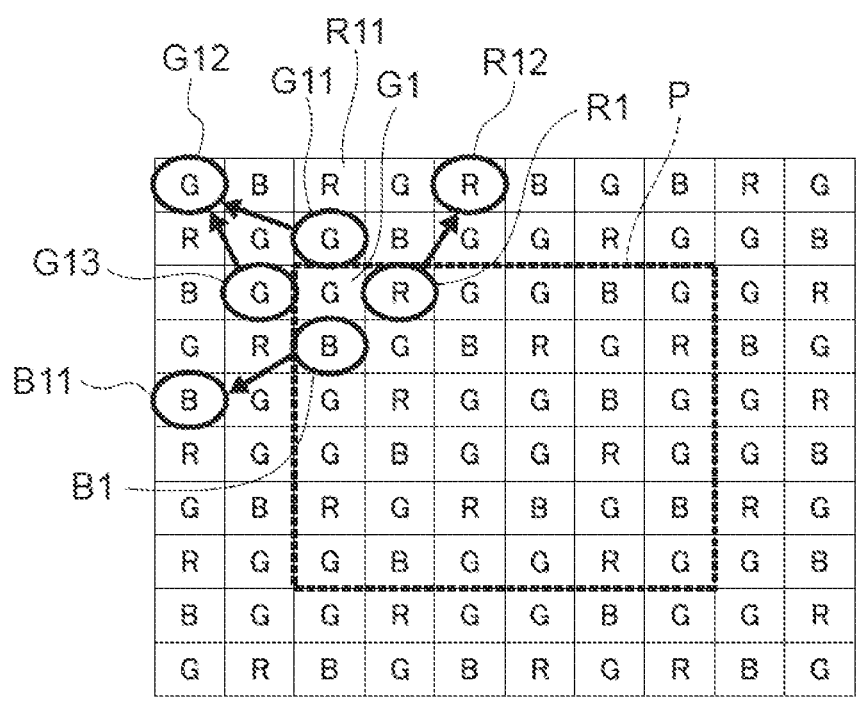
FIG. 9 is a diagram to explain color mixing correction processing.

First, explanation follows regarding a case in which color mixing correction is performed on G pixel G1. As illustrated in FIG. 9, in the original image array before 1/2 thinning (a first array), the G pixel G11 that is in adjacent contact with the top side of the G pixel G1 is a pixel that is not read in 1/2 thinning (see FIG. 8). In the array after 1/2 thinning (a second array), the pixel that is in adjacent contact with the top side of the G pixel G1 is the R pixel R11 (see FIG. 8), this being a color that is different to that of the G pixel G11 that is in adjacent contact in the first array. There would accordingly be a deterioration in precision of color mixing correction if color mixing correction were to be performed according to the above Equation (1) using the pixel data of the R pixel R11 as D1.

Thus, in the present exemplary embodiment, the pixel data of the G pixel G12 is employed for D1 in Equation (1), the G pixel G12 being the same color as the G pixel G11 in adjacent contact at the top side of the color mixing correction subject pixel, G pixel G1, in the first array, and having the shortest distance from the G pixel G11 in the first array.

Moreover, for the B pixel B1 that is in adjacent contact at the bottom side of the G pixel G1, the pixel data for the B pixel B11 that has the shortest distance from the B pixel B1 is employed as D2 in Equation (1).

Moreover, for the G pixel G13 that is in adjacent contact at the left side of the G pixel G1, similarly to the G pixel G11, the pixel data of the G pixel G12 that has the shortest distance from the G pixel G13 is employed as D3 in Equation (1).

Moreover, for the R pixel R1 that is in adjacent contact at the right side of the G pixel G1, the pixel data of the R pixel R12 that has the shortest distance from the R pixel R1 is employed as D4 in Equation (1).

Note that as R pixels having the shortest distance from the R pixel R1, there is not only the R pixel R12, but also the R pixel R11. In such cases, the pixel data of either the R pixel R11 or the R pixel R12 may be employed as D4 in Equation (1), or an average value of the pixel data of the R pixel R11 and the R pixel R12 may be employed therefor. Employing the average value enables extreme deterioration of precision of color mixing correction to be suppressed whatever the image.

Figure 10:
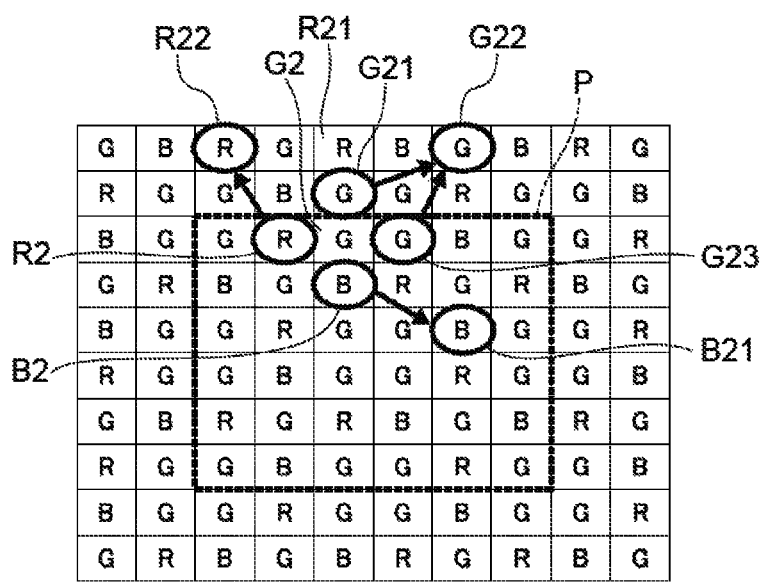
FIG. 10 is a diagram to explain color mixing correction processing.

Explanation next follows regarding a case in which color mixing correction is performed for the G pixel G2. As illustrated in FIG. 10, in the original image array before 1/2 thinning (a first array), the G pixel G21 that is in adjacent contact with the top side of the G pixel G2 is a pixel that is not read in 1/2 thinning (see FIG. 8). In the array after 1/2 thinning (a second array), the pixel that is in adjacent contact at the top side of the G pixel G2 is the R pixel R21 (see FIG. 8), this being a color that is different to that of the G pixel G21 that is in adjacent contact in the first array. There would accordingly be a deterioration in precision of color mixing correction if color mixing correction were to be performed according to the above Equation (1) using the pixel data of the R pixel R21 as D1.

Thus, in the present exemplary embodiment, the pixel data of the G pixel G22 is employed for D1 in Equation (1), the G pixel G22 being the same color as the G pixel G21 that is in adjacent contact with the color mixing correction subject pixel, G pixel G2, in the first array, and having the shortest distance from the G pixel G21 in the first array.

Moreover, for the B pixel B2 that is in adjacent contact at the bottom side of the G pixel G2, the pixel data for the B pixel B21 that has the shortest distance from the B pixel B2 is employed as D2 in Equation (1).

Moreover, for the R pixel R2 that is in adjacent contact at the left side of the G pixel G2, the pixel data of the R pixel R22 that has the shortest distance from the R pixel R2 is employed as D3 in Equation (1).

Note that as R pixels having the shortest distance from the R pixel R2, there is not only the R pixel R22, but also the R pixel R21. In such cases, the pixel data of either the R pixel R21 or the R pixel R22 may be employed as D3 in Equation (1), or an average value of the pixel data of the R pixel R21 and the R pixel R22 may be employed therefor.

Moreover, for the G pixel G23 that is in adjacent contact at the right side of the G pixel G2, similarly to the G pixel G21, the pixel data of the G pixel G22 that has the shortest distance from the G pixel G23 is employed as D4 in Equation (1).

Figure 11:
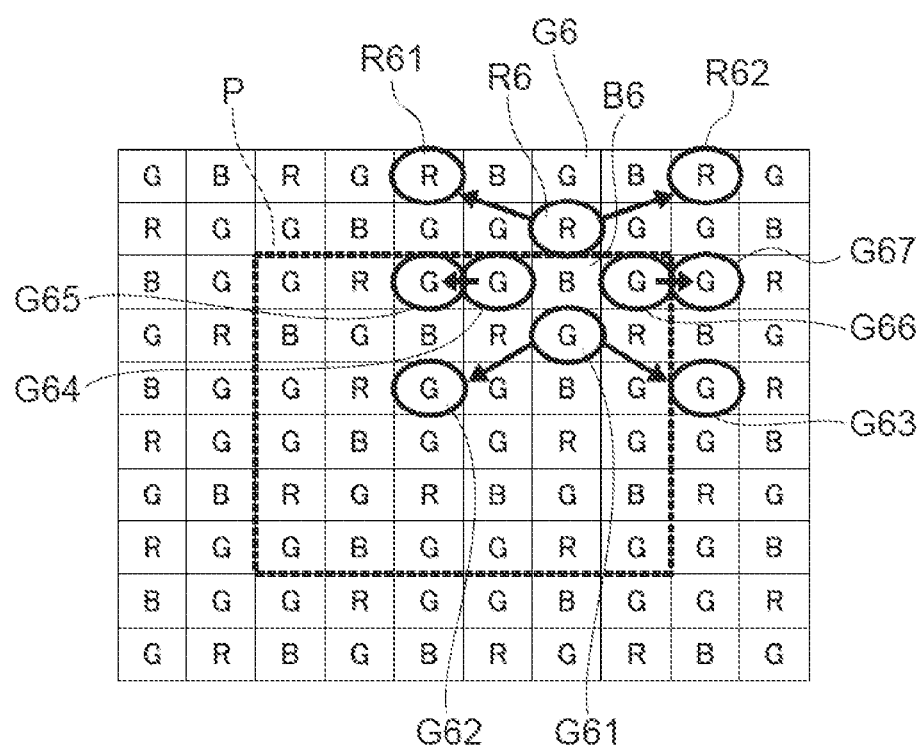
FIG. 11 is a diagram to explain color mixing correction processing.

Explanation next follows regarding a case in which color mixing correction is performed for the B pixel B6. As illustrated in FIG. 11, in the original image array before 1/2 thinning (a first array), the R pixel R6 that is in adjacent contact with the top side of the B pixel B6 is a pixel that is not read in 1/2 thinning (see FIG. 8). In the array after 1/2 thinning (a second array), the pixel that is in adjacent contact at the top side of the B pixel B6 is the G pixel G6 (see FIG. 8), this being a color that is different to that of the R pixel R6 that is in adjacent contact in the first array. There would accordingly be a deterioration in precision of color mixing correction if color mixing correction were to be performed according to the above Equation (1) using the pixel data of the G pixel G6 as D1.

Thus, in the present exemplary embodiment, the average value of the pixel data of the R pixels R61, R62 that are the same color as the pixel data of the R pixel R6 that is in adjacent contact with the color mixing correction subject pixel, B pixel B6 in the first array and that have the shortest distance from the R pixel R6 in the first array is employed for D1 in Equation (1).

Moreover, for the G pixel G61 that is in adjacent contact at the bottom side of the B pixel B6, the average value of the pixel data for the G pixels G62, G63 having the shortest distance from the G pixel G61 is employed as D2 in Equation (1).

Moreover, for the G pixel G64 that is in adjacent contact at the left side of the B pixel B6, the pixel data of the G pixel G65 that has the shortest distance from the G pixel G64 is employed as D3 in Equation (1).

Moreover, for the G pixel G66 that is in adjacent contact at the right side of the B pixel B6, the pixel data of the G pixel G67 that has the shortest distance from the G pixel G66 is employed as D4 in Equation (1).

Figure 12:
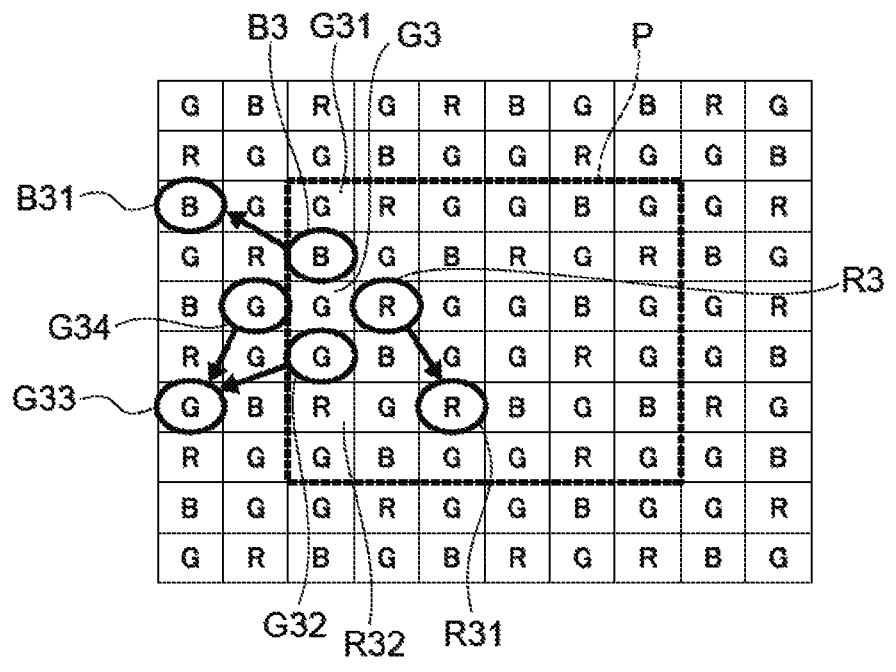

Explanation next follows regarding a case in which the G pixel G3 is color mixing corrected. As illustrated in FIG. 12, in the original image array before 1/2 thinning (the first array), the B pixel B3 that is in adjacent contact with the top side of the G pixel G3 is a pixel that is not read in 1/2 thinning (see FIG. 8). In the array after 1/2 thinning (a second array), the pixel that is in adjacent contact at the top side of the G pixel G3 is the G pixel G31 (see FIG. 8), this being a color that is different to that of the B pixel B3 that is in adjacent contact in the first array. There would accordingly be a deterioration in precision of color mixing correction if color mixing correction were to be performed according to the above Equation (1) using the pixel data of the G pixel G31 as D1.

Thus, in the present exemplary embodiment, the pixel data of the B pixel B31 that is the same color as the B pixel B3 that is in adjacent contact with the color mixing correction subject pixel, G pixel G3, in the first array, and that has the shortest distance from the B pixel B3 in the first array is employed for D1 in Equation (1).

Moreover, for the G pixel G32 that is in adjacent contact at the bottom side of the G pixel G3, the pixel data for the G pixel G33 having the shortest distance front the G pixel G32 is employed as D2 in Equation (1).

Moreover, for the G pixel G34 that is in adjacent contact at the left side of the G pixel G3, similarly to the G pixel G32, the pixel data of the G pixel G33 that has the shortest distance from the G pixel G34 is employed as D3 in Equation (1).

Moreover, for the R pixel R3 that is in adjacent contact at the right side of the G pixel G3, the pixel data of the R pixel R31 that has the shortest distance from the R pixel R3 is employed as D4 in Equation (1).

Note that as the R pixel with the shortest distance from the R pixel R3, there is not only the R pixel R31, but also the R pixel R32. In such cases, the pixel data of either the R pixel R31 or the R pixel R32 may be employed as D4 in Equation (1), or an average value of the pixel data of the R pixel R31 and the R pixel R32 may be employed as D4 in Equation (1).

Figure 13:
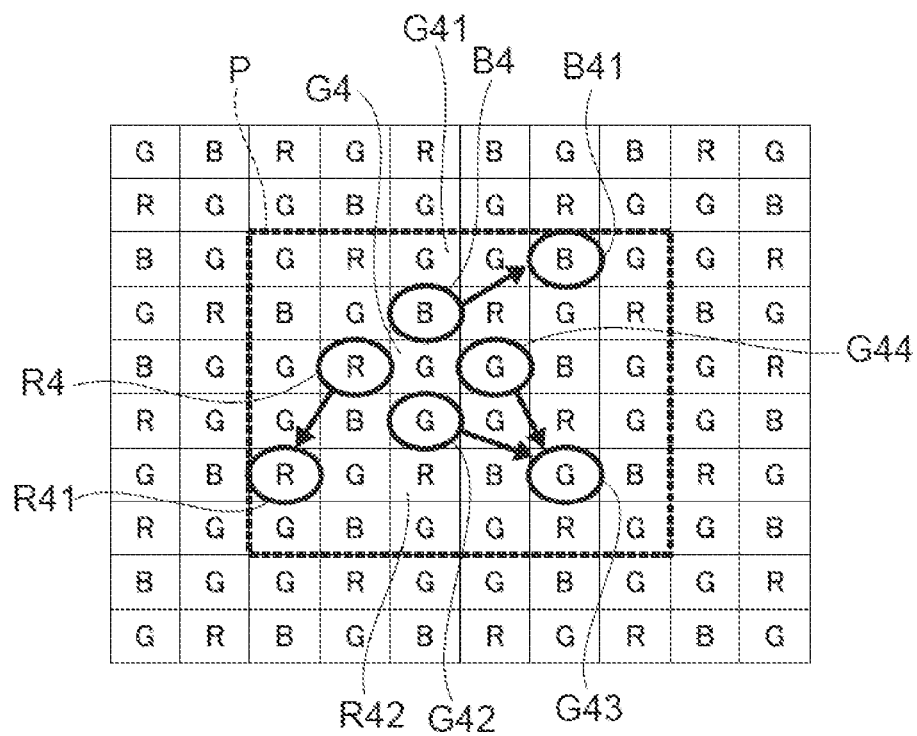
FIG. 13 is a diagram to explain color mixing correction processing.

Explanation next follows regarding a case in which the G pixel G4 is color mixing corrected. As illustrated in FIG. 13, in the original image array before 1/2 thinning (the first array), the B pixel B4 that is in adjacent contact with the top side of the G pixel G4 is a pixel that is not read in 1/2 thinning (see FIG. 8). In the array after 1/2 thinning (a second array), the pixel that is in adjacent contact at the top side of the G pixel G4 is the G pixel G41 (see FIG. 8), this being a color that is different to that of the B pixel B4 that is in adjacent contact in the first array. There would accordingly be a deterioration in precision of color mixing correction if color mixing correction were to be performed according to the above Equation (1) using the pixel data of the G pixel G41 as D1.

Thus, in the present exemplary embodiment, the pixel data of the B pixel B41 that is the same color as the B pixel B4 that is in adjacent contact with the color mixing correction subject pixel, G pixel G4, in the first array, and that has the shortest distance from the B pixel B4 in the first array is employed for D1 in Equation (1).

Moreover, for the G pixel G42 that is in adjacent contact at the bottom side of the G pixel G4, the pixel data for the G pixel G43 having the shortest distance from the G pixel G42 is employed as D2 in Equation (1).

Moreover, for the R pixel R4 that is in adjacent contact at the left side of the G pixel G4, the pixel data of the R pixel R41 that has the shortest distance from the R pixel R4 is employed as D3 in Equation (1).

Note that as the R pixel with the shortest distance from the R pixel R4, there is not only the R pixel R41, but also the R pixel R42. In such cases, the pixel data of either the R pixel R41 or the R pixel R42 may be employed as D3 in Equation (1), or an average value of the pixel data of the R pixel R41 and the pixel R42 may be employed as D3 in Equation (1).

Moreover, for the G pixel G44 that is in adjacent contact at the right side of the G pixel G4, similarly to the G pixel G42, the pixel data of the G pixel G43 that has the shortest distance from the G pixel G44 is employed as D4 in Equation (1).

Figure 14:
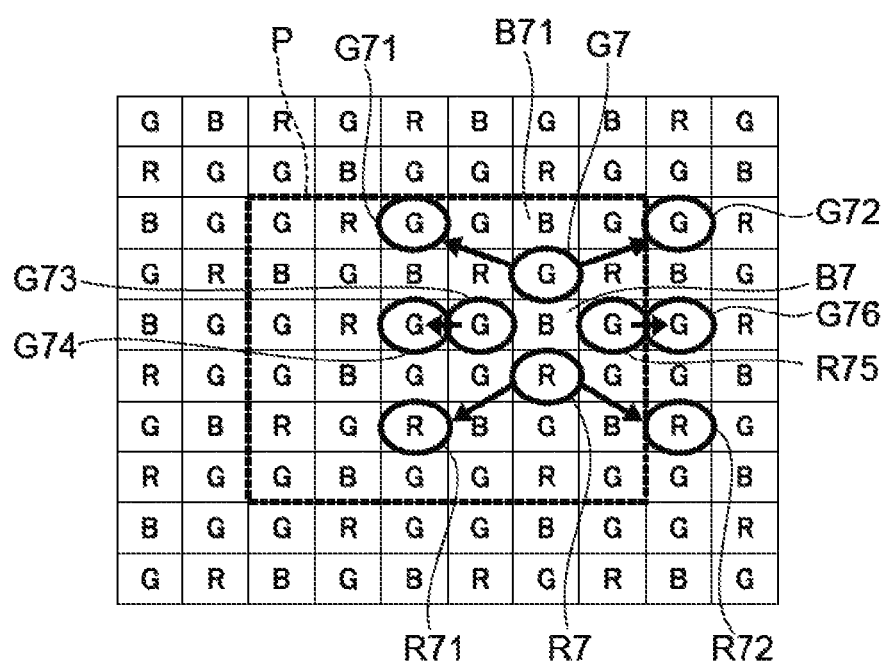
FIG. 14 is a diagram to explain color mixing correction processing.

Explanation next follows regarding a case in which color mixing correction is performed for the B pixel B7. As illustrated in FIG. 14, in the original image array before 1/2 thinning (a first array), the G pixel G7 that is in adjacent contact with the top side of the B pixel B7 is a pixel that is not read in 1/2 thinning (see FIG. 8). In the array after 1/2 thinning (a second array), the pixel that is in adjacent contact at the top side of the B pixel B7 is the B pixel B71 (see FIG. 8), this being a color that is different to that of the G pixel G7 that is in adjacent contact in the first array. There would accordingly be a deterioration in precision of color mixing correction if color mixing correction were to be performed according to the above Equation (1) using the pixel data of the B pixel B71 as D1.

Thus, in the present exemplary embodiment, the average value of the pixel data of the G pixels G71, G72, that are the same color as the pixel data of the G pixel G7 that is in adjacent contact with the color mixing correction subject pixel, B pixel B7, in the first array, and that have the shortest distance from the G pixel G7 in the first array, is employed for D1 in Equation (1).

Moreover, for the R pixel R7 that is in adjacent contact at the bottom side of the B pixel B7, the average value of the pixel data for the R pixels R71, R72 having the shortest distance from the R pixel R7 is employed as D2 in Equation (1).

Moreover, for the G pixel G73 that is in adjacent contact at the left side of the B pixel B7, the pixel data of the G pixel G74 that has the shortest distance from the G pixel G73 is employed as D3 in Equation (1).

Moreover, for the pixel G75 that is in adjacent contact at the right side of the B pixel B7, the pixel data of the G pixel G76 that has the shortest distance from the G pixel G75 is employed as D4 in Equation (1).

Figure 15:
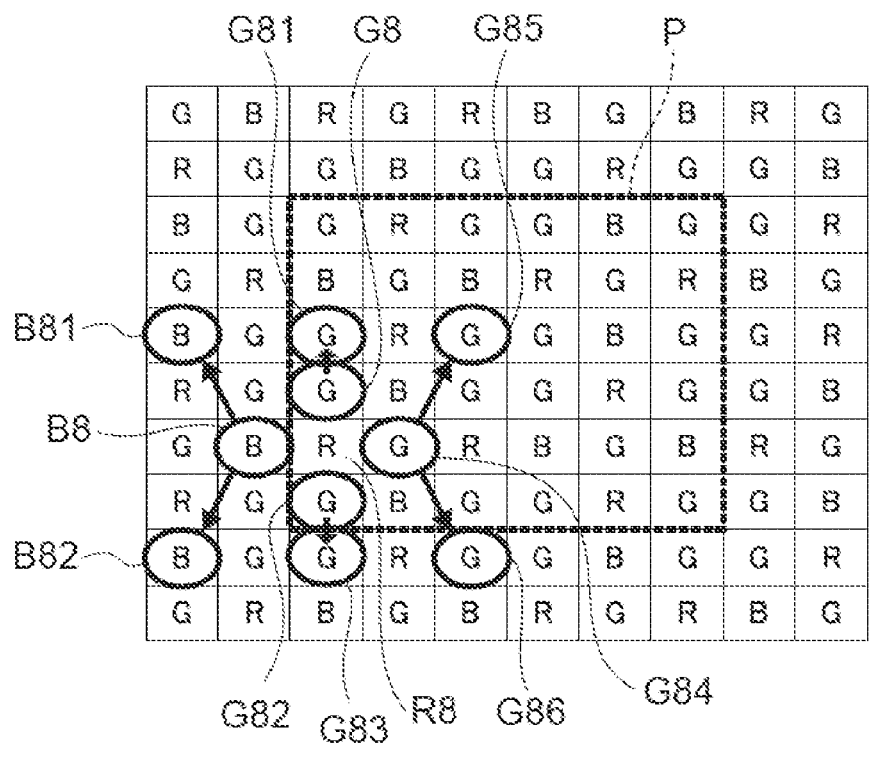

Explanation next follows regarding a case in which color mixing correction is performed for the R pixel R8. As illustrated in FIG. 15, in the original image array before 1/2 thinning (a first array), the pixel G8 that is in adjacent contact with the top side of the R pixel R8 is a pixel that is not read in 1/2 thinning (see FIG. 8). In the array after 1/2 thinning (a second array), the pixel that is in adjacent contact at the top side of the R pixel R8 is the G pixel G81 (see FIG. 8), this being a color that is the same as that of the G pixel G8 that is in adjacent contact in the first array. Thus the pixel data of the G pixel G81 that has the shortest distance from the G pixel G8 in the first array is employed for D1 in Equation (1).

Moreover, for the G pixel G82 that is in adjacent contact at the bottom side of the R pixel R8, the pixel data for the G pixel G83 having the shortest distance from the G pixel G82 is employed as D2 in Equation (1).

Moreover, for the B pixel B8 that is in adjacent contact at the tell side of the R pixel R8, the average value of the pixel data of the B pixels B81, B82 that have the shortest distance from the B pixel B8 is employed as D3 in Equation (1).

Moreover, for the G pixel G84 that is in adjacent contact at the right side of the R pixel R8, the average value of the pixel data of the G pixels G85, G86 that have the shortest distance from the G pixel G84 is employed as D4 in Equation (1).

Figure 16:
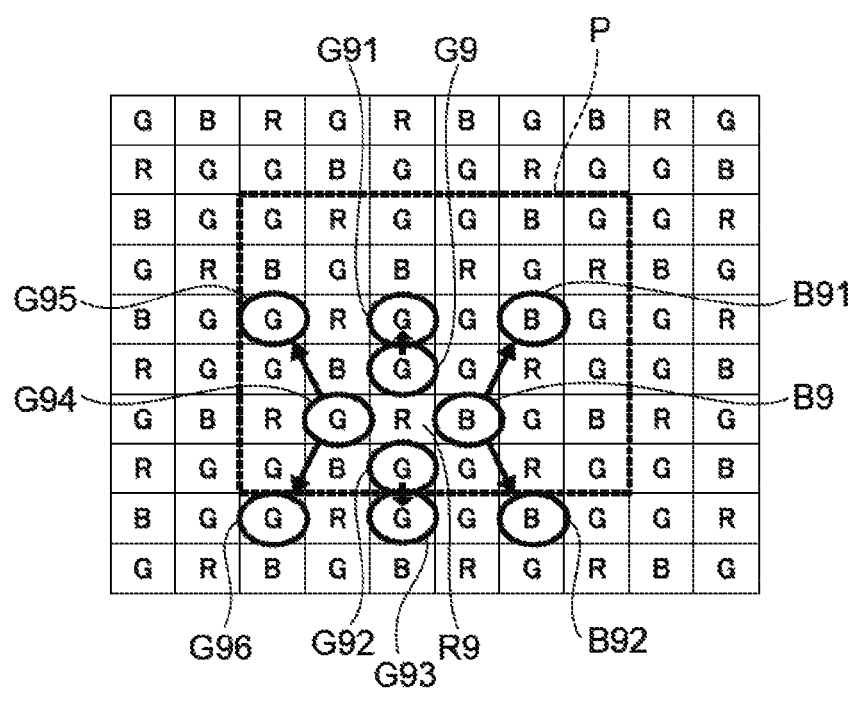

Explanation next follows regarding a case in which color mixing correction is performed for the R pixel R9. As illustrated in FIG. 16, in the original image array before 1/2 thinning (a first array), the G pixel G9 that is in adjacent contact with the top side of the R pixel R9 is a pixel that is not read in 1/2 thinning (see FIG. 8). In the array after 1/2 thinning (a second array), the pixel that is in adjacent contact at the top side of the R pixel R9 is the G pixel G91 (see FIG. 8), this being a color that is the same as that of the G pixel G9 that is in adjacent contact in the first array. Thus the pixel data of the G pixel G91 that has the shortest distance from the G pixel G9 in the first array is employed for D1 in Equation (1).

Moreover, for the G pixel G92 that is in adjacent contact at the bottom side of the R pixel R9, the pixel data for the G pixel G93 having the shortest distance from the G pixel G92 is employed as D2 in Equation (1).

Moreover, for the G pixel G94 that is in adjacent contact at the left side of the R pixel R9, the average value of the pixel data of the G pixels G95, G96 that have the shortest distance from the G pixel G94 is employed as D3 in Equation (1).

Moreover, for the B pixel B9 that is in adjacent contact at the right side of the R pixel R9, the average value of the pixel data of the B pixels B91, B92 that have the shortest distance from the B pixel B9 is employed as D4 in Equation (1).

Figure 17:
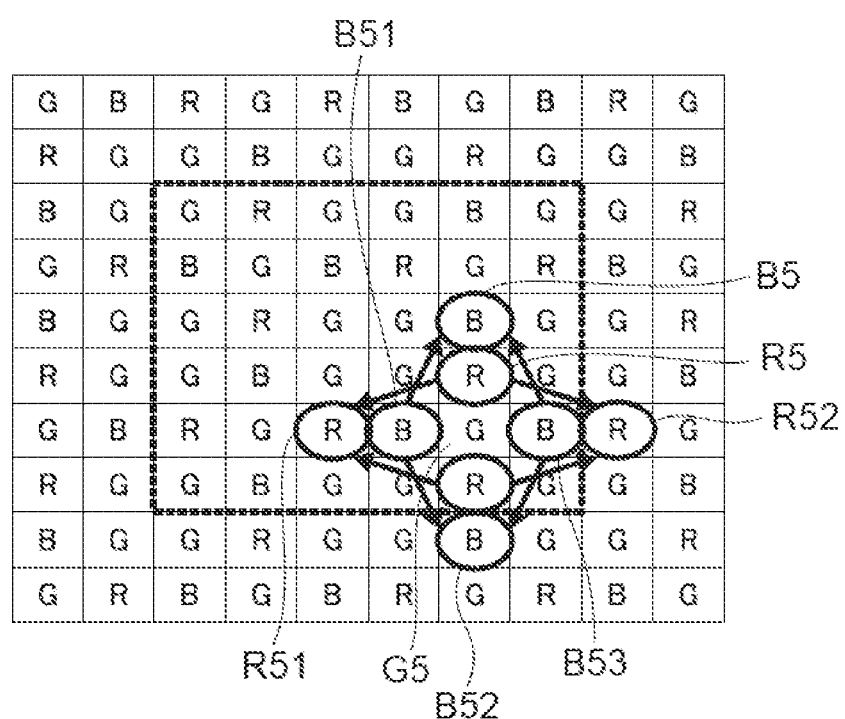
FIG. 17 is a diagram to explain color mixing correction processing.

Explanation next follows regarding a case in which the G pixel G5 is color mixing corrected. As illustrated in FIG. 17, in the original image array before 1/2 thinning (the first array), the R pixel R5 that is in adjacent contact with the top side of the G pixel G5 is a pixel that is not read in 1/2 thinning (see FIG. 8). In the array after 1/2 thinning (a second array), the pixel that is in adjacent contact at the top side of the G pixel G5 is the B pixel B5, this being a color that is different to that of the R pixel R5 that is in adjacent contact in the first array. There would accordingly be a deterioration in precision of color mixing correction if color mixing correction were to be performed according to the above Equation (1) using the pixel data of the B pixel B5 as D1.

Thus, in the present exemplary embodiment, the average value of the pixel data of the R pixels R51, R52 that have the same color as the R pixel R5 that is in adjacent contact at the top side of the color mixing correction subject pixel, G pixel G5, in the first array, and that have the shortest distance from the R pixel R5 in the first array is employed for D1 in Equation (1).

Moreover, for the R pixel R53 that is in adjacent contact at the bottom side of the G pixel G5, similarly to with the R pixel R5, the average value of the pixel data for the R pixels R51, R52 having the shortest distance from the R pixel R53 is employed as D2 in Equation (1).

Moreover, for the B pixel B51 that is in adjacent contact at the left side of the G pixel G5, the average value of the pixel data for the B pixels B5, B52 having the shortest distance from the B pixel B51 is employed as D3 in Equation (1).

Moreover, for the B pixel B53 that is in adjacent contact at the right side of the G pixel G5, similarly to with the B pixel B51, the average value of the pixel data for the B pixels B5, B52 having the shortest distance from the B pixel B53 is employed as D4 in Equation (1).

Note that the controller 24 and the image processing section 20 may be configured by a computer including a CPU, ROM, RAM and non-volatile ROM. In such cases, the processing program for the above processing may, for example, be pre-stored on the non-volatile ROM, and may be executed by reading by the CPU.

Thus in the present exemplary embodiment, the pixel data of the subject pixels are corrected based on the pixel data of the pixels that have the same color to that of the adjacent pixels that are adjacent to the color mixing correction subject pixels in the array before thinning (the first array), and that have the shortest distance from the adjacent pixels in the array before thinning. Ibis thereby enables color mixing correction to be performed with excellent precision even when the color array of an image before thinning is different from the color array of the image after thinning.

Note that explanation has been given in the present exemplary embodiment of a case in which pixel data of each of the pixels is read at 2 pixel cycles in both the vertical direction and the horizontal direction, namely at 1/2 thinning, however pixel data of each of the pixels may also be read at a cycle of 3 pixel cycles or higher. However, when pixel data of each of the pixels is read at a cycle exceeding 3 pixels, the distance between the color mixing correction subject pixels and the pixels employed in color mixing correction becomes longer, sometimes leading to a deterioration in the precision of color mixing correction, thus preferably pixel data of each of the pixels is read at a cycle of 3 or fewer pixel cycle. The reading cycle may also be different between the vertical direction and horizontal direction.

Second Exemplary Embodiment

Explanation next follows regarding a second exemplary embodiment of the present invention. Explanation is given of a modified example of a color filter in the present exemplary embodiment.

Figure 18:
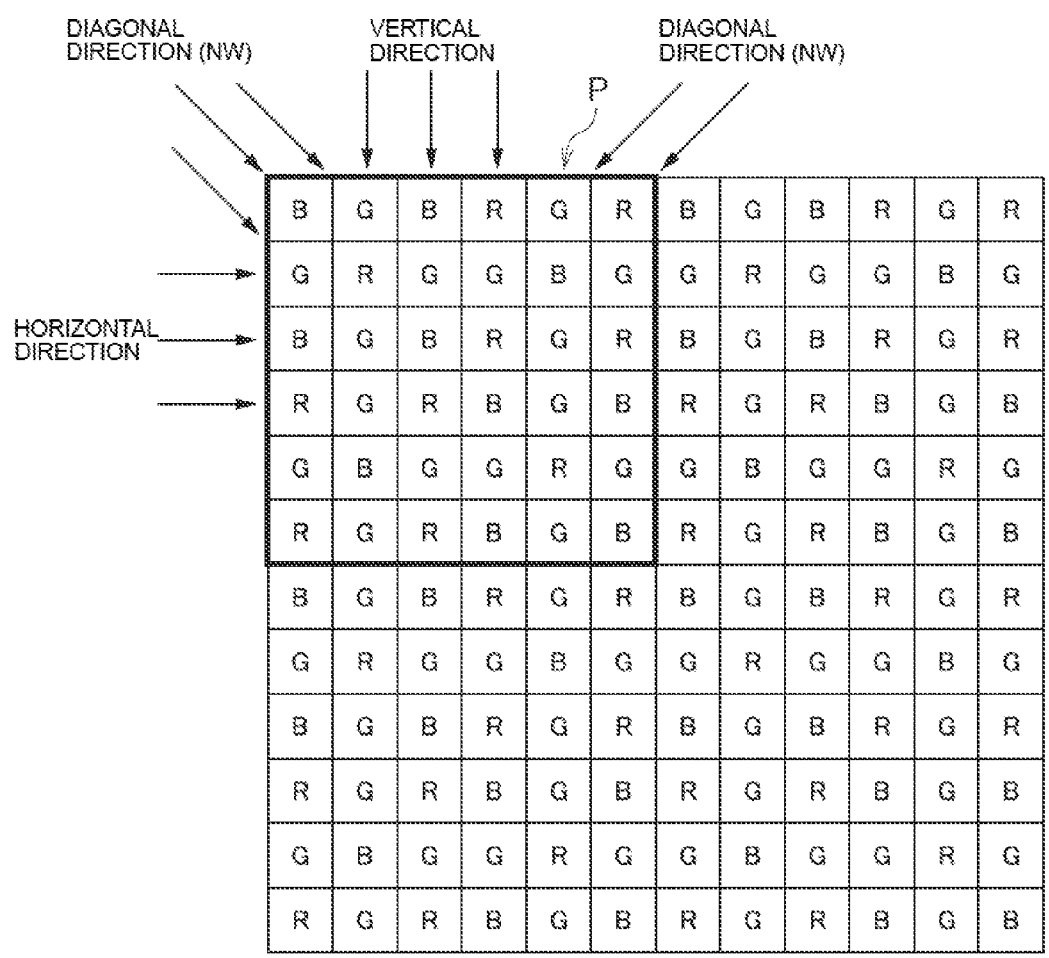
FIG. 18 is a configuration diagram of a color filter according to a second exemplary embodiment.

FIG. 18 illustrates a color filter according to the present exemplary embodiment. The color filter according to the present exemplary embodiment, as illustrated in FIG. 18, includes a basic array pattern P (the pattern indicated by the bold frame) formed from a square array pattern corresponding to 6×6 pixels, with the basic array pattern P disposed so as to repeat in both the horizontal direction and the vertical direction. Namely, the color filter is arrayed such that the respective filters of each color R, G, B (the R filters, G filters, B filters) have a specific periodicity.

Moreover, in the color filter array illustrated in FIG. 18, the filter is placed in each line of the color filter array in both the vertical direction and horizontal direction.

Moreover, in the color filter array illustrated in FIG. 18, one or more respectively of the R filter and the B filter is placed in the basic array pattern P in each of the lines of the color filter array in both the vertical direction and horizontal direction.

Figure 19:
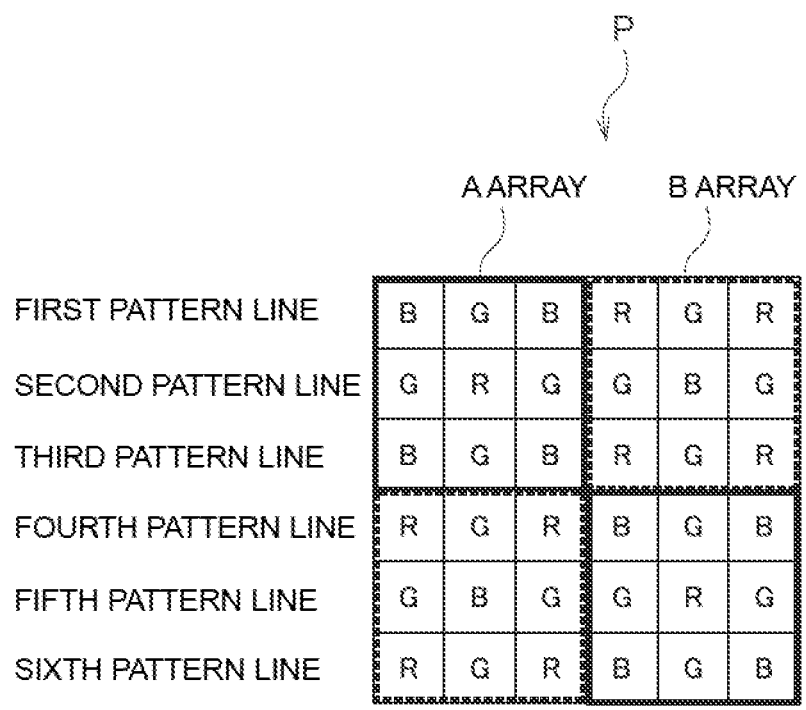
FIG. 19 is a diagram illustrating a basic array pattern contained in a color filter according to the second exemplary embodiment.

FIG. 19 illustrates a state in which the basic array pattern P illustrated in FIG. 18 has been divided into 4 sets of 3×3 pixels.

The basic array pattern P illustrated in FIG. 19 may be perceived as an A array of the 3×3 pixels surrounded by the solid line frame, and a B array of the 3×3 pixels surrounded by the broken line frame, alternately disposed along the horizontal and vertical directions.

In the A array, the R filter is placed at the center, and the B filters are placed at the 4 corners, and G filters are placed on both sides of the central R filter at the top and bottom, and left and right. However in the B array, the B filter is placed at the center, and the R filters are placed at the 4 corners, and filters are placed on both sides of the central B filter at the top and bottom, and left and right. Namely, the A array and the B array have reverse positional relationships for the R filters and the B filters, but have similar placement otherwise.

Figures 20A, 20B:
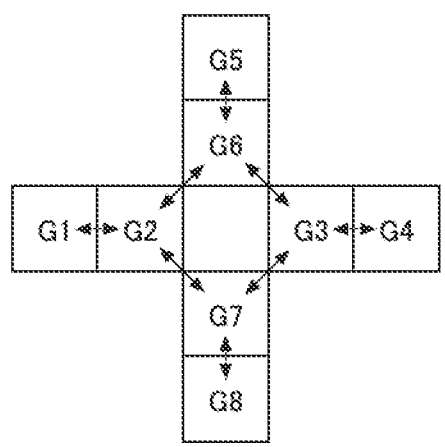
FIG. 20A is a diagram illustrating a color filter in which 6×6 pixel basic array patterns contained in a color filter according to the second exemplary embodiment are split into 3×3 pixel A arrays and B arrays that are repeatedly disposed along a horizontal direction and a vertical direction.
FIG. 20B is a diagram illustrating a distinctive placement of G pixels in a color filter according to the second exemplary embodiment.

As illustrated in FIG. 20A, the color filter of the second exemplary embodiment may be perceived as the A array and the B array, alternately disposed in the vertical direction and the horizontal direction.

As illustrated in FIG. 20A, when a 5×5 pixel local region (a region illustrated by a bold line frame) centered on an A array is extracted from a mosaic image output from the image pickup device 14, the 8 individual pixels within this local region are placed in a cross shape, as illustrated in FIG. 20B. The G pixels therein are denoted, in sequence from left to right, G1, G2, G3, G4, and in sequence from top to bottom, G5, G6, G7, G8. Thus the pixels G1, G2, and the pixels G3, G4 are in adjacent contact with each other in the horizontal direction, the pixels G5, G6 and the pixels G7, G8 are in adjacent contact with each other in the vertical direction, the pixels G6, G3 and the pixels G2, G7 are in adjacent contact with each other in the diagonal direction toward the top left, and the pixels G6, G2 and the pixels G3, G7 are in adjacent contact with each other in the diagonal direction toward the top right.

Thus deriving the difference absolute values of the pixel values of these adjacent pixels, enables the direction from out of each of the horizontal, vertical and diagonal directions (NE, NW) that has the smallest change in brightness (the correlation direction with the highest correlation) to be determined by the minimum pixel separation.

Namely, the sum of the difference absolute values in the horizontal direction is |G1−G2|+|G3 −G4|, the sum of the difference absolute values in the vertical direction is |G5−G6|+|G7−G8|, the sum of the difference absolute values in the diagonal direction towards the top right is |G6−G2|+|G3−G7|, and the sum of the difference absolute values in the diagonal direction towards the top left is |G6−G3|+|G2−G7|.

The correlation (correlation direction)can then be determined as the direction with the smallest difference absolute value out of these four correlation absolute values. Note that the determined correlation direction can be employed during the performance of processing such as synchronization processing.

The basic array pattern P that configures the color filter illustrated in FIG. 18 has point symmetry about the center of the basic array pattern P.

As illustrated in FIG. 19, the A array and the B array within the basic array pattern each have point symmetry about a central R filter, or B filter, and are top-bottom and left-right symmetrical (have line symmetry).

Moreover, the size of the basic array pattern P that configures the color filter array illustrated in FIG. 18 is (N×M) pixels (wherein N, M are integers of 3 or more), which is greater than the size (K×L) of the common pixels (wherein K, L are integers of 2 or more). Namely, N>K, and M>L is satisfied.

The color filter according to the second exemplary embodiment accordingly has the same features to the features (1), and (3) to (5) of the color filter according to the first exemplary embodiment. (Features (2), (3) incorporate the feature that 1 or more of the G filter, the R filter, and the B filter is placed in each of the lines in the vertical direction and horizontal direction of the color filter array within the basic array pattern P.

Figure 21:
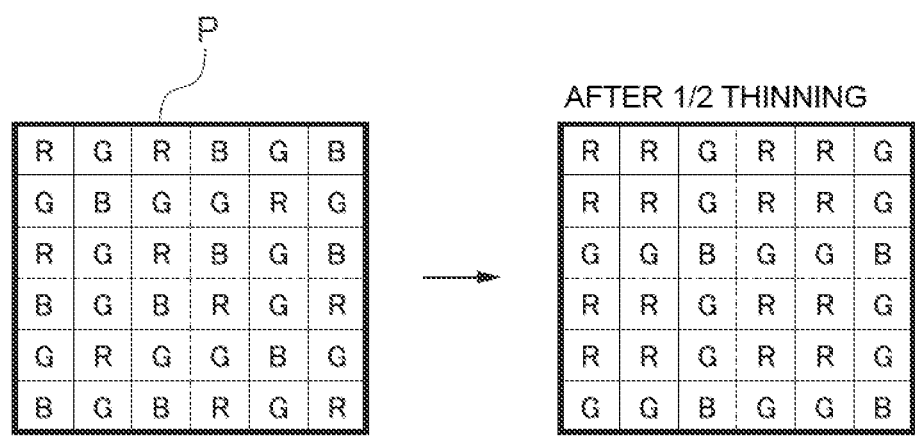
FIG. 21 is a diagram to explain an image after thinning according to the second exemplary embodiment.

Thus for such a color filter, when 1/2 thinning reading is performed in both the vertical direction and horizontal direction similarly to in the first exemplary embodiment, the image after thinning is the image as illustrated in FIG. 21.

Note that the color filter array is not limited to those described in each of the exemplary embodiments, and the present invention may also be applied to an imaging apparatus having an image pickup device with the following color filter array.

Figure 22:
FIG. 22 is a diagram of a modified example of a color filter.

For example, as a color filter array having the above features (1), (2) and (3), there is, for example, a color filter in which the basic array pattern P is a 3×3 pixel color filter as illustrated in FIG. 22. This color filter array is configured by a repeating basic pattern with the G filters placed at the center and the 4 corners out of the 3×3 pixels, and the same number each of R and B placed on the remaining 4 pixels. An image from 1/2 thinning in both the vertical direction and horizontal direction is an image such as the one illustrated in FIG. 22.

Figure 23:
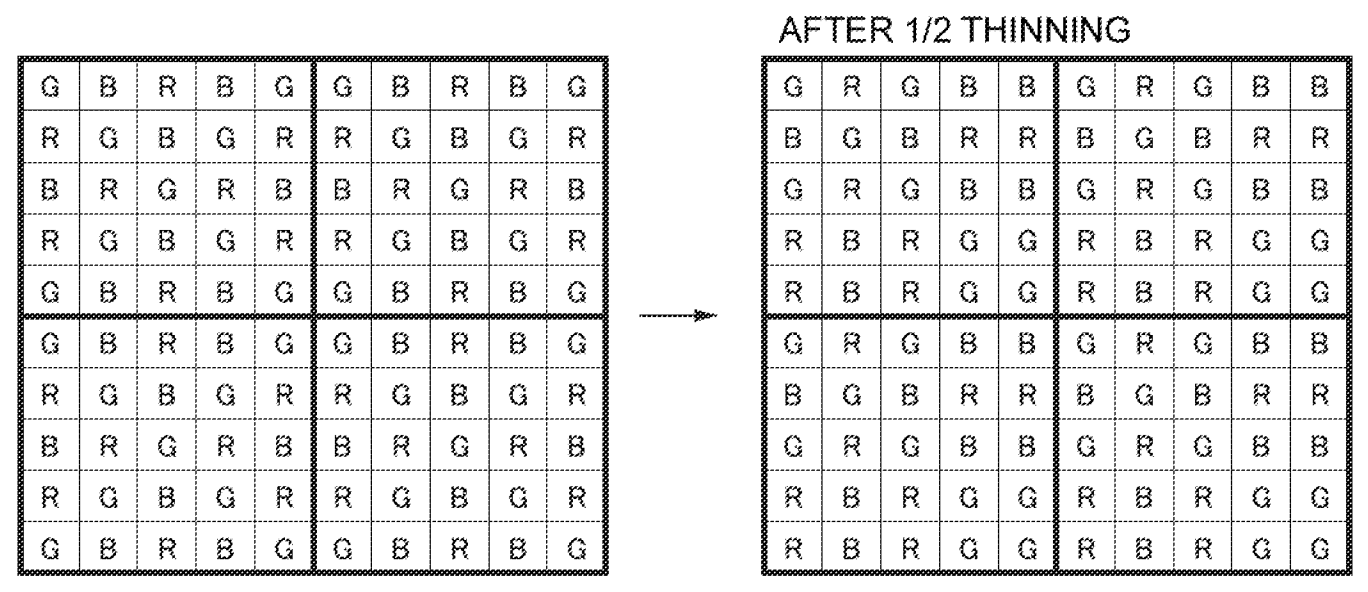

Moreover, as a color filter array having the above features (1), (2) and (3), there is a color filter array of 5×5 pixels in the basic array pattern P such as that illustrated in FIG. 23. This color filter array is configured by a repeating basic array pattern P set with G placed along the two diagonal directions in the 5×5 pixels, and with R, B pixels placed on the remaining pixel positions such that there is 1 or more of each disposed in each of the horizontal direction and vertical direction lines in the 5×5 pixels, set such the number of G is greater than the number of R and the number of B. An image from 1/2 thinning in the vertical direction and horizontal direction is an image such as the one illustrated in FIG. 23.

Figure 24:
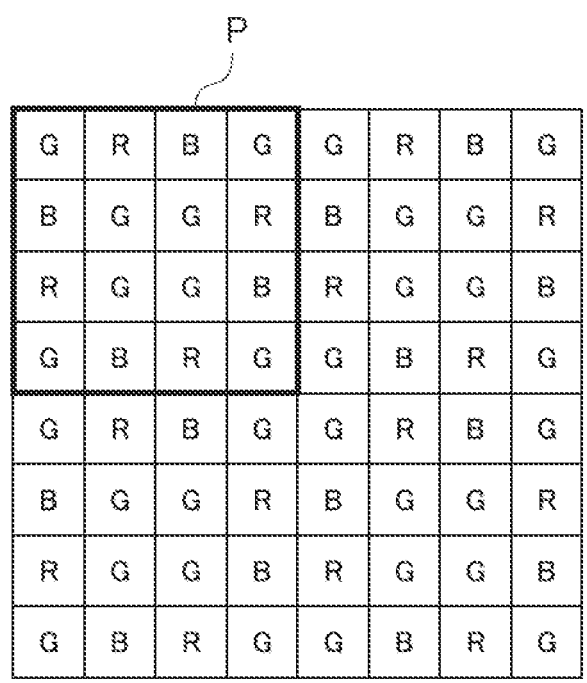
FIG. 24 is a diagram of a modified example of a color filter.

As well as this, as a color filter array having the above features (1), (3), (4) and (5), there is a color filter array of 4×4 pixels of a basic array pattern P such as that illustrated in FIG. 24. This color filter array is a repeating basic array pattern in which G is placed along the two diagonal directions of the 4×4 pixels, and R, B pixels are placed on the remaining pixel positions such that there is 1 or more of each disposed in each of the horizontal direction and vertical direction lines in the 4×4 pixels, set such the number of G is greater than the number of R, B.

Figure 25:
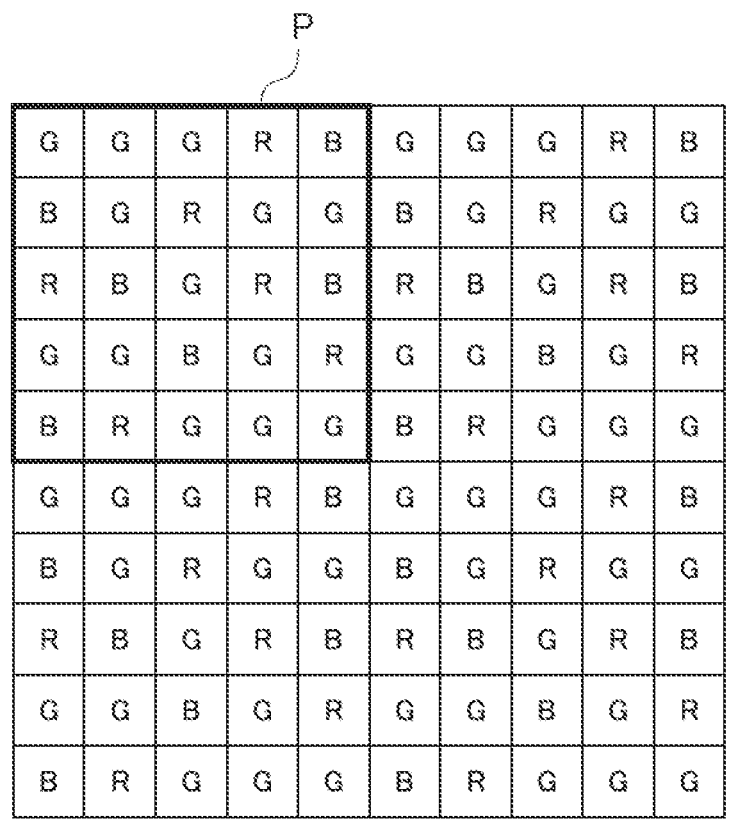
FIG. 25 is a diagram of a modified example of a color filter.

Moreover, there is, as illustrated in FIG. 25, a color filter array in which the basic array pattern P has 5×5 pixels.

Moreover, there is, as illustrated in FIG. 26 a color filter array in which the basic array pattern P has 6×6 pixels. This color filter array is configured by a repeating basic array pattern P including a first sub array with G placed in a rectangular shape at the external perimeter of an R or B, and a second sub array in which G is placed at a center portion, with two of each of the sub arrays alternately disposed so as to be adjacent to each other along the horizontal direction and the vertical direction. Such an array is feature (3) with the additional characteristic of 1 or more of each of R and B being placed in each line in the diagonal (NE, NW) directions (third directions) of the color filter array.

Figure 27:
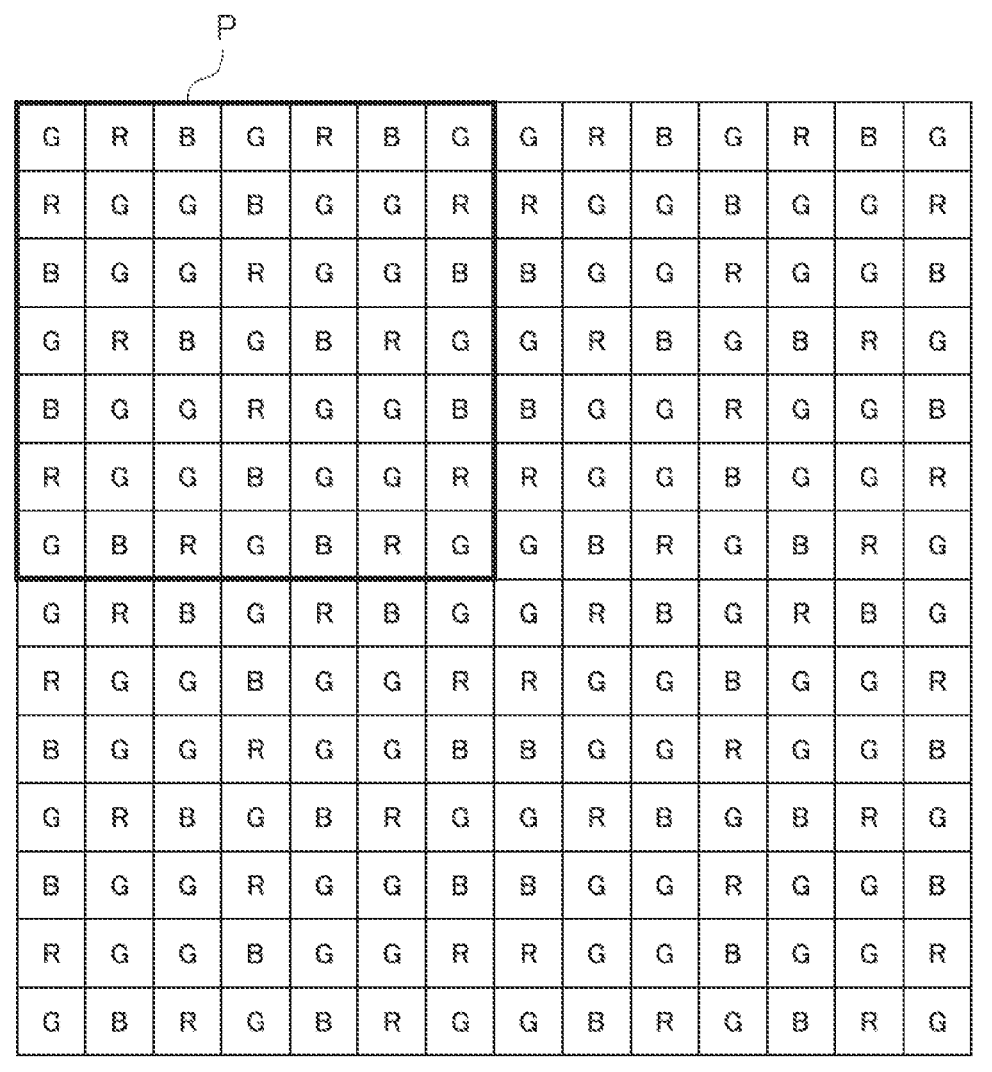
Figure 28:
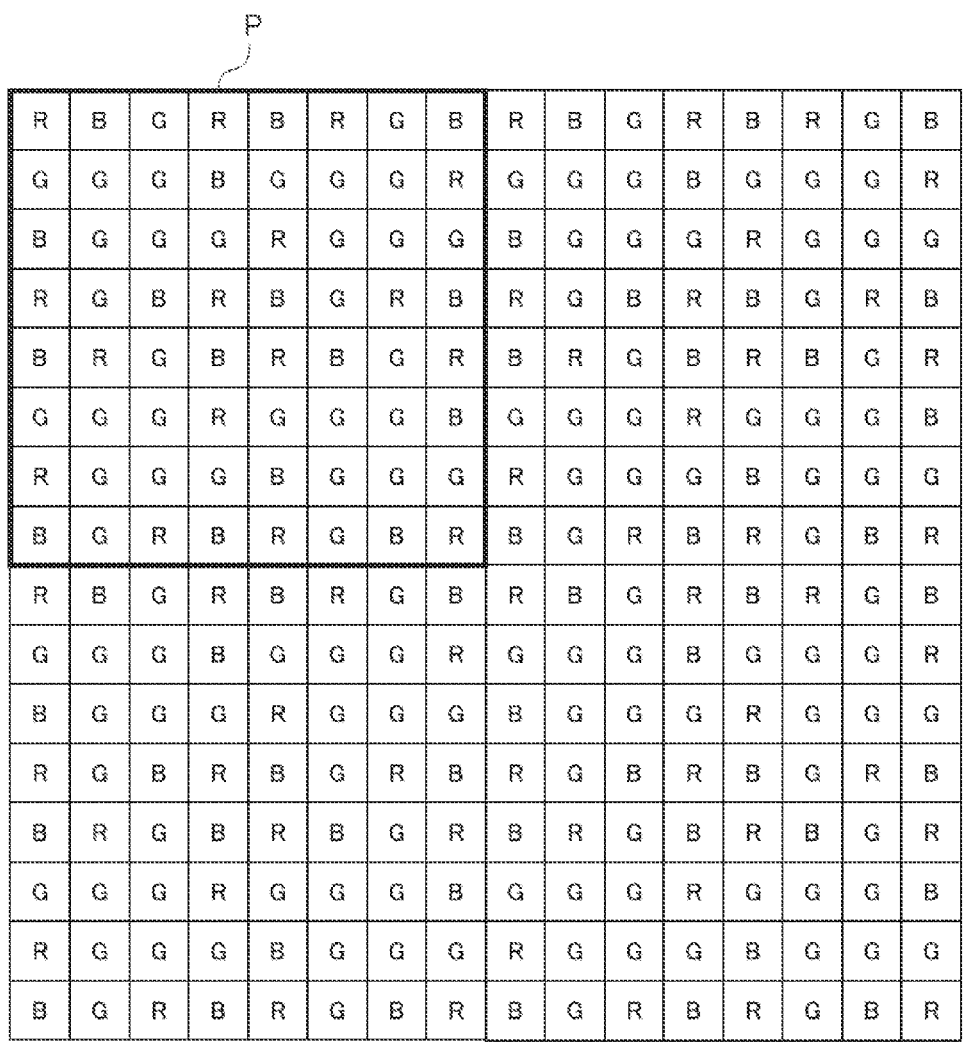
FIG. 28 is a diagram of a modified example of a color filter.

Moreover, there is, as illustrated in FIG. 27 a color filter array in which the basic array pattern P has 7×7 pixels, and, as illustrated in FIG. 28, a color filter array in which the basic array pattern P has 8×8 pixels, and so on.

Note that in consideration of the ease of image processing, such as synchronization processing or thinning processing during video image capture, preferably N, M are each 10 or lower.

Note that the size N×M of the basic array pattern applied in the present invention is preferably 5×5 or greater, and is more preferably 10×10 or lower. When the size in pixels of the basic array pattern increases in the horizontal direction, the degrees of freedom for placement of the 3 colors, RGB, pixels increases, and the number of combinations of color placement of peripheral side pixels increases, raising the possibility that the basic array pattern of the image before thinning and the basic array pattern after thinning are different from each other, making the present invention applicable. For cases of 5×5 or greater, there are 25 or more pixels, and so the advantageous effect of the present invention can be obtained sufficiently. N, M are preferably 10 or lower considering the ease of image processing, such as synchronization processing, and thinning processing during video image capture.

Figure 29:
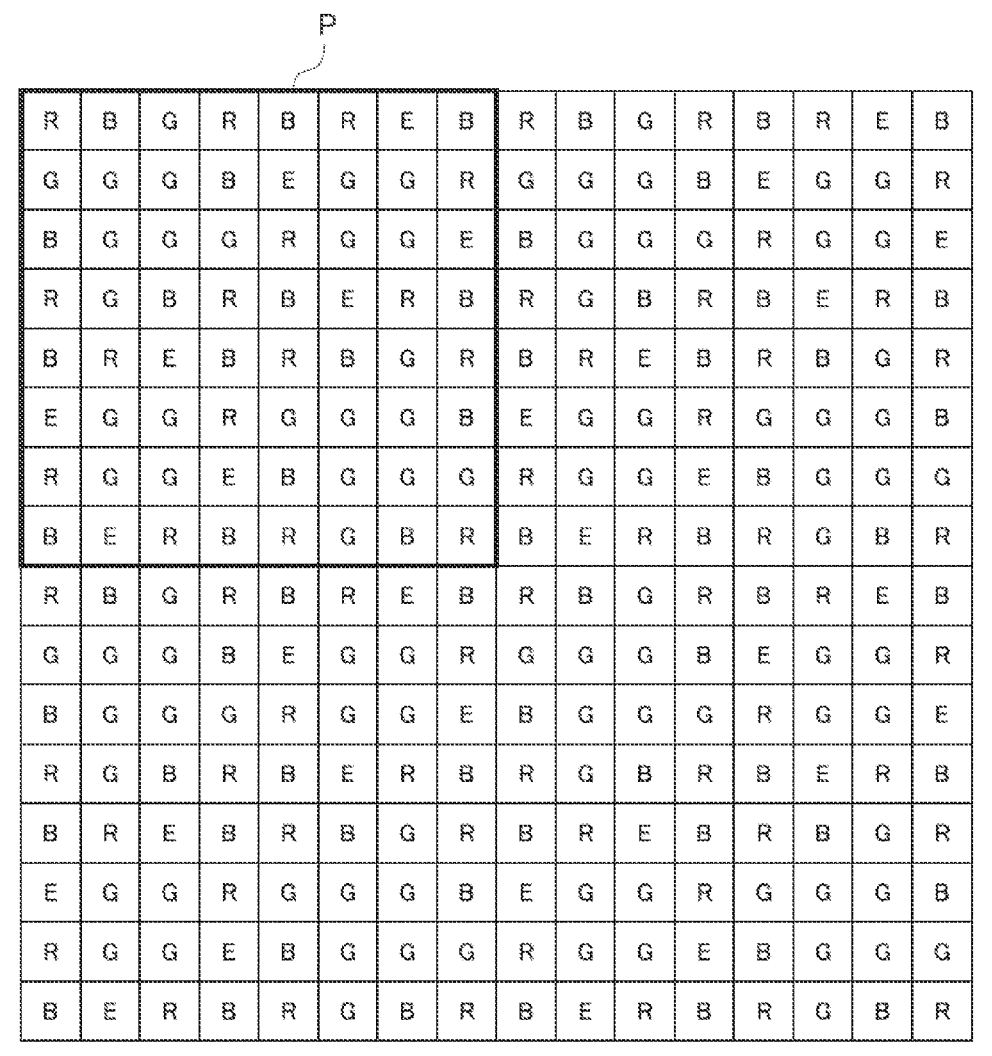

Moreover, although explanation has been given in the above exemplary embodiment of a case in which there is a color image pickup device having 3 primary color filters, RGB, the present invention is not limited thereto, and application may be made to a color filter having 4 colors of the three primary colors RGB+one other color (for example, emerald (E)), such as for example the color filter illustrated in FIG. 29. Moreover, the present invention may be applied to a color filter having a white or transparent (W) filter as the other color. For example, a W filter may be placed instead of the emerald of FIG. 29. In such cases, a combination of W and G, or W is the first color that contributes most to the brightness signal.

Moreover, the present invention may be applied to a color image pickup device including a color filter with a complementary color system of 4 colors with, in addition to G, C (cyan), M (magenta) and Y (yellow), that are the complementary colors of the primary colors RGB.

It goes without saying that the present invention is not limited by the exemplary embodiments that are described above, and various other modifications may be implemented within a range not departing from the spirit of the present invention.

What is claimed is:

1. An imaging apparatus comprising:
    an image pickup device comprising a plurality of photoelectric conversion elements arrayed in a predetermined first direction and a second direction intersecting with the first direction;
    a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern;
    a drive section that drives the image pickup device such that, for an array of pixels to read from the image pickup device a thinning process is used so that pixel data of pixels placed at a set cycle in at least one direction of the first direction or the second direction is read by said thinning process to give an array pattern of the color filter used for the second array that is different from the array pattern of the color filter used for a first array, such that a vertical pattern and horizontal pattern of said pixels after said thinning process in each of said color filters is different from said vertical pattern and horizontal pattern before said thinning process, the second array and first array expressing an array of all the pixels read from the image pickup device; and
    a color mixing correction section that performs color mixing correction for each of the pixel data of the pixels placed at the set cycle, wherein the color mixing correction section corrects pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array,
    wherein the array pattern of said color filter used for said first array is different from the array pattern of said color filter used for said second array.

2. The imaging apparatus of claim 1, wherein:
    one or more of the first filter is placed in each line in the color filter in the first direction, the second direction, and third directions that intersect with the first direction and the second direction; and
    the second filters that respectively correspond to each color of the second colors are placed such that there is 1 or more of each in each line in the basic array pattern in the first direction and the second direction.

3. The imaging apparatus of claim 1, wherein:
    the color filter is a color filter with a repeatedly disposed basic array pattern, the basic array pattern having the first filter that corresponds to the first color that contributes most to obtaining the brightness signal, and the second filters that respectively correspond to 2 or more second colors other than the first color, placed in a predetermined pattern of (N×M) pixels (wherein N, M are integers of 3 or more) in the first direction and the second direction.

4. The imaging apparatus of claim 1, wherein:
    the color filter includes a square array corresponding to 2×2 pixels configured from the first filter.

5. The imaging apparatus of claim 1, wherein:
    the first color is green (G), and the second colors are red (R) and blue (B).

6. The imaging apparatus of claim 5, wherein:
    the color filter includes an R filter, a G filter, and a B filter corresponding to colors red (R), green (G) and blue (B); and
    the color filter is configured by a first array and a second array alternately arrayed in the first direction and the second direction, wherein the first array corresponds to 3×3 pixels with the G filter placed at the center and the 4 corners, the B filter placed at the top and bottom of the central G filter, and the R filter placed at the left and right of the central G filter, and the second array corresponds to 3×3 pixels with the G filter placed at the center and the 4 corners, the R filter placed at the top and bottom of the central G filter, and the B filter placed at the left and right of the central G filter.

7. The imaging apparatus of claim 5, wherein:
    the color filter includes an R filter, a G filter, and a B filter corresponding to colors red (R), green (G) and blue (B); and
    the color filter is configured by a first array and a second array alternately arrayed in the first direction and the second direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

8. The imaging apparatus of claim 1, wherein:
the color mixing correction section corrects pixel data of the subject pixel based on pixel data of one pixel out of a plurality of pixels in cases in which there are a plurality of pixels present at the shortest distance.

9. The imaging apparatus of claim 1, wherein:
the color mixing correction section corrects pixel data of the subject pixel based on an average value of pixel data of a plurality of pixels in cases in which there are a plurality of pixels present at the shortest distance.

10. The imaging apparatus of claim 1, wherein:
the cycle is a cycle of 3 or fewer pixels.

11. The imaging apparatus of claim 1, further comprising a switching section that switches the cycle.

12. A control method for an imaging apparatus comprising an image pickup device including a plurality of photoelectric conversion elements arrayed in a predetermined first direction and a second direction intersecting with the first direction, a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern, the control method comprising:
driving the image pickup device such that, for an array of pixels to read from the image pickup device a thinning process is used so that pixel data of pixels placed at a set cycle in at least one direction of the first direction or the second direction is read by said thinning process to give an array pattern of the color filter used for the second array that is different from the array pattern of the color filter used for a first array, such that a vertical pattern and horizontal pattern of said pixels after said thinning process in each of said color filters is different from said vertical pattern and horizontal pattern before said thinning process, the second array and first array expressing an array of all the pixels of the image pickup device; and
color mixing correction processing that performs color mixing correction for each of the pixel data of the pixels placed at the set cycle, wherein pixel data of a subject pixel for color mixing correction is corrected based on pixel data of a pixel that is the same color as an adjacent pixel in adjacent contact with the subject pixel in the first array, and that is a pixel that has the shortest distance from the adjacent pixel in the first array.

13. A non-transitory storage medium storing a control program that causes processing to be executed in a computer that controls an imaging apparatus, comprising an image pickup device including a plurality of photoelectric conversion elements arrayed in a predetermined first direction and a second direction intersecting with the first direction, a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern, the processing comprising:
a step of driving the image pickup device and using a thinning process so that, for an array of pixels to read from the image pickup device, pixel data of pixels placed at a set cycle in at least one direction of the first direction or the second direction is read by said thinning process to give an array pattern of the color filter used for the second array that is different from the array pattern of the color filed used for a first array, such that a vertical pattern and horizontal pattern of said pixels after said thinning process in each of said color filters is different from said vertical pattern and horizontal pattern before said thinning process, the second array and first array expressing an array of all the pixels of the image pickup device; and
a step of color mixing correction processing that performs color mixing correction for each of the pixel data of the pixels placed at the set cycle, wherein pixel data of a subject pixel for color mixing correction is corrected based on pixel data of a pixel that is the same color as an adjacent pixel in adjacent contact with the subject pixel in the first array, and that is a pixel that has the shortest distance from the adjacent pixel in the first array.

14. A non-transitory storage medium storing a control program that causes processing to be executed in a computer, the processing being color mixing correction processing to correct color mixing of an array of pixels read from an image pickup device in which a thinning process is used in reading said pixels, including a plurality of photoelectric conversion elements arrayed in a predetermined first direction and a second direction intersecting with the first direction, a color filter that is provided above a plurality of pixels configured by the plurality of photoelectric conversion elements, the color filter having a repeatedly disposed basic array pattern that includes a first filter corresponding to a first color that contributes most to obtaining a brightness signal, and second filters respectively corresponding to 2 or more second colors other than the first color, placed in a predetermined pattern, and the color mixing correction processing performing color mixing correction for respective pixel data of read pixels wherein the pixel data is for pixels placed at a set cycle in at least one direction of the first direction or the second direction to give a second array that is different from a first array expressing an array of all the pixels of the image pickup device, such that a vertical pattern and horizontal pattern of said pixels after said thinning process in each of said color filters is different from said vertical pattern and horizontal pattern before said thinning process, and including a step of correcting pixel data of a subject pixel for color mixing correction based on pixel data of a pixel that is the same color as an adjacent pixel in adjacent contact with the subject pixel in the first array, and that is a pixel that has the shortest distance from the adjacent pixel in the first array,
wherein the array pattern of said color filter used for said first array is different from the array pattern of said color filter used for said second array.

* * * * *